US006697331B1

(12) United States Patent
Riihinen et al.

(10) Patent No.: US 6,697,331 B1
(45) Date of Patent: Feb. 24, 2004

(54) LINK LAYER ACKNOWLEDGEMENT AND RETRANSMISSION FOR CELLULAR TELECOMMUNICATIONS

(75) Inventors: Wesa Riihinen, Luleå (SE); Staffan Johansson, Luleå (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 09/441,882

(22) Filed: Nov. 17, 1999

(51) Int. Cl.[7] ................................................ H04L 1/00
(52) U.S. Cl. ....................... 370/236; 370/338; 370/410; 714/746
(58) Field of Search .............................. 370/328, 329, 370/338, 345, 346, 349, 449, 913; 714/55, 748, 746, 749, 750

(56) References Cited

U.S. PATENT DOCUMENTS

| 4,975,952 | A |   | 12/1990 | Mabey et al. |
| 5,425,025 | A |   | 6/1995 | Tahara |
| 5,440,545 | A |   | 8/1995 | Buchholz et al. |
| 5,570,367 | A | * | 10/1996 | Ayanoglu et al. ............ 370/346 |
| 5,774,479 | A | * | 6/1998 | Lee et al. .................... 714/749 |
| 6,134,693 | A | * | 10/2000 | Fukuda ........................ 714/750 |

FOREIGN PATENT DOCUMENTS

| EP | 0 658 028 A2 | 6/1995 |
| EP | 0 695 053 A2 | 1/1996 |
| WO | 96/30841 A | 10/1996 |
| WO | 00/33503 | 6/2000 |

OTHER PUBLICATIONS

Stallings, "Data and Computer Communications", 5th Edition, 1997, pp. 171–176.
Taiwanese Office Action dated Sep. 19, 2002 and English translation thereof.
Balakrishnan et al, Improving Reliable Transport and Hand-off Performance in Cellular Wireless Networks, Computer Science Div., Dept. of Electrical Engineering and Computer Science, presented at the ACM Mobile Computing & Networking Conference (Mobicom '95), Berkeley, California, Nov. 14–15, 1995.
ITU–T Recommendation Q.2110: "B–ISDN ATM Adaptation Layer—Service Specific Connection Oriented Protocol (SSCOP)", Jul. 1994, International Telecommunication Union, Geneva, CH.

(List continued on next page.)

Primary Examiner—Ricky Ngo
Assistant Examiner—Christopher M. Swickhamer
(74) Attorney, Agent, or Firm—Nixon & Vanderhye, P.C.

(57) ABSTRACT

A mobile telecommunications system comprises a mobile user equipment unit and at least one node through which a packet switched data session is established between the user equipment unit and a data network. One of the node and the user equipment unit serves as a transmitter of segments of data packets and the other of the node and the user equipment unit serves as a receiver of the segments of data packets. If the first lost segment is not received within a timed interval, and if a second lost segment is also lost during the timed interval, at expiration of the timed interval the receiver sends a selective acknowledgment message to the transmitter which requests retransmission of both the first lost segment and the second lost segment. The acknowledgment messages of the system have a unique format including start sequence number and a variable size bitmap field. The start sequence number (ssn) is mapped to a first non-received segment in a receive buffer; the first bit in the bitmap maps to a segment with a sequence number equal to the start sequence number. In differing embodiments, the bitmaps of the acknowledgment messages may have or may not have a stop bit. The transmitter has a poll timer that is started/restarted and canceled in accordance with novel timer operational rules.

32 Claims, 19 Drawing Sheets

OTHER PUBLICATIONS

Simmons, "Proof of Correctness of ATM Retransmission Scheme", Computer Networks and ISDN Systems, NL, North Holland Publishing, Amsertdam, vol. 29, No. 2, 1997, pp. 181–194.

U.S. patent application Ser. No. 09/201,389, filed Nov. 30, 1998 entitled "Method and Apparatus for Ensuring Reliable Data Communication".

* cited by examiner

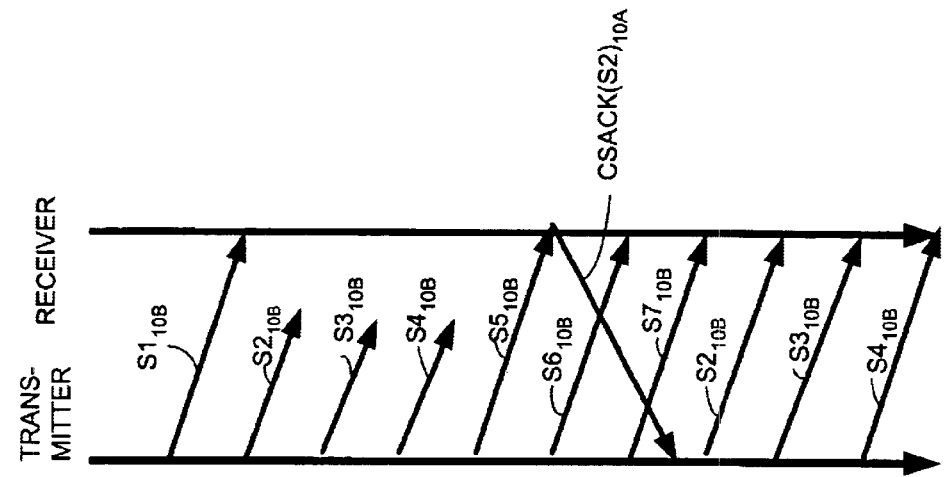
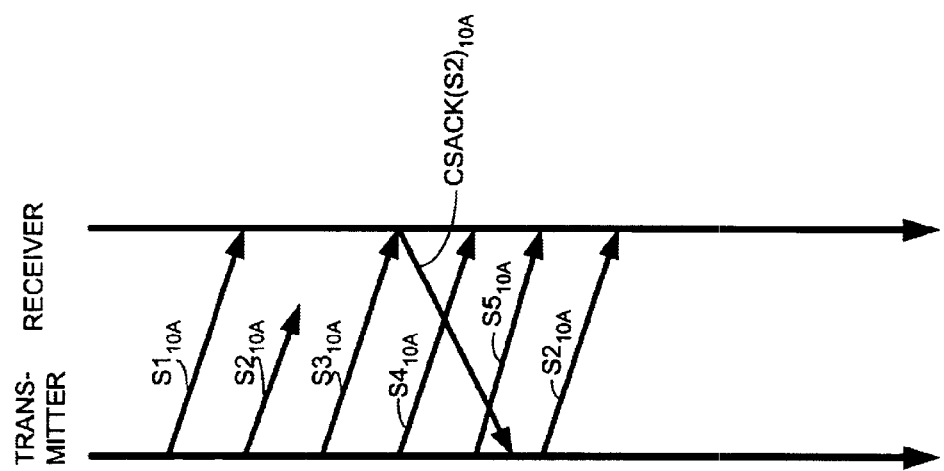

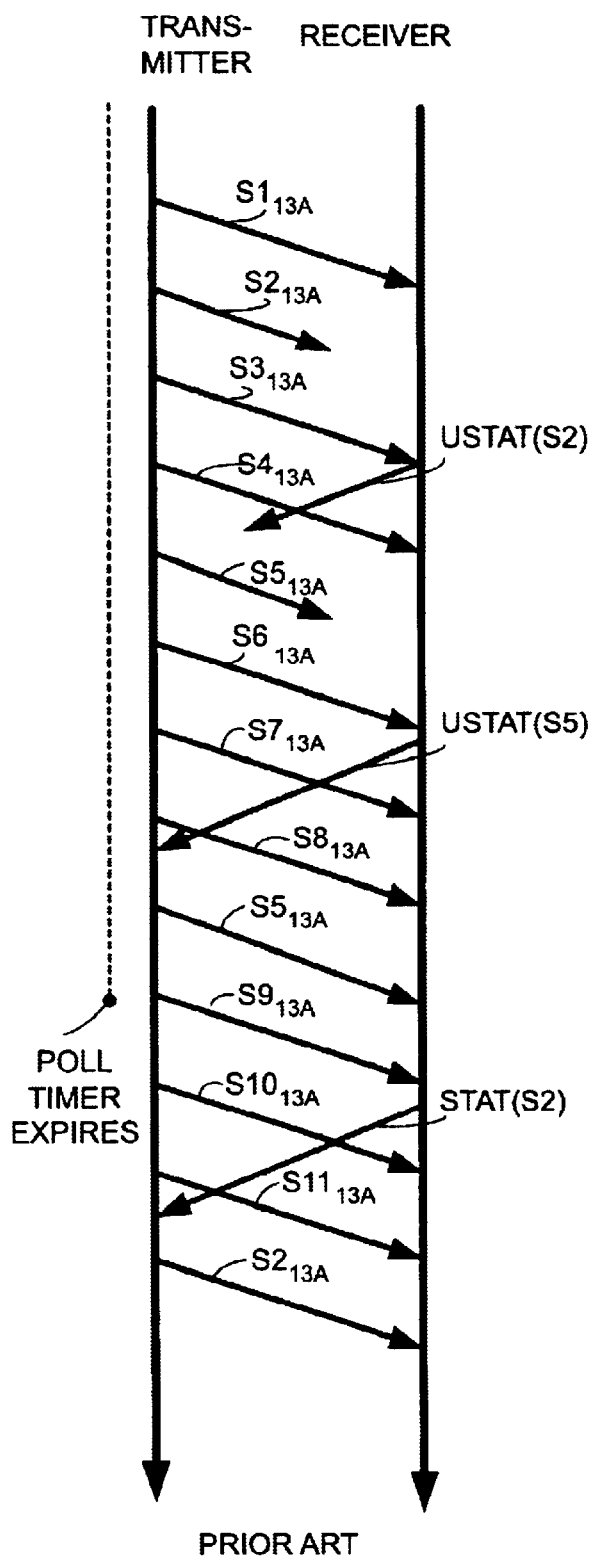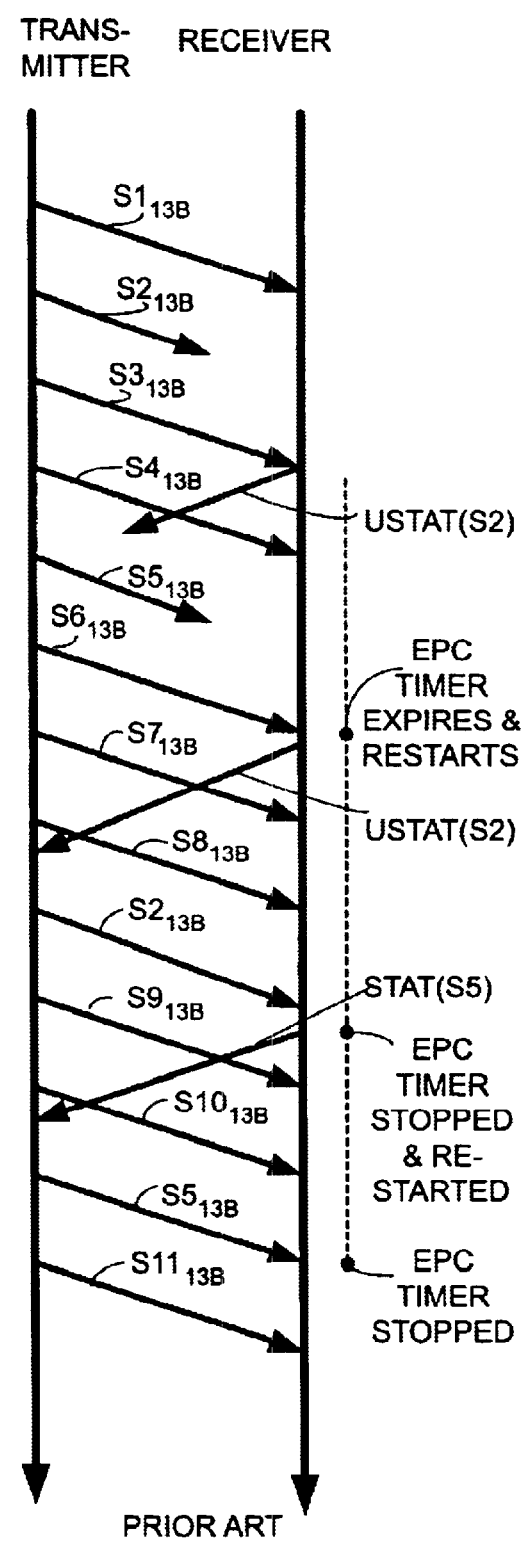

| BLER | P(stall) | | | | |
|---|---|---|---|---|---|
| | 1 | 2 | 3 | 4 | 5 |
| 0.01 | 0.01 | 0.0001 | 0.000001 | 1E-08 | 1E-10 |
| 0.03 | 0.03 | 0.0009 | 0.000027 | 8.1E-07 | 2.43E-08 |
| 0.05 | 0.05 | 0.0025 | 0.000125 | 6.25E-06 | 3.13E-07 |
| 0.07 | 0.07 | 0.0049 | 0.000343 | 2.4E-05 | 1.68E-06 |
| 0.09 | 0.09 | 0.0081 | 0.000729 | 6.56E-05 | 5.9E-06 |
| 0.11 | 0.11 | 0.0121 | 0.001331 | 0.000146 | 1.61E-05 |
| 0.13 | 0.13 | 0.0169 | 0.002197 | 0.000286 | 3.71E-05 |
| 0.15 | 0.15 | 0.0225 | 0.003375 | 0.000506 | 7.59E-05 |
| 0.17 | 0.17 | 0.0289 | 0.004913 | 0.000835 | 0.000142 |
| 0.19 | 0.19 | 0.0361 | 0.006859 | 0.001303 | 0.000248 |
| 0.21 | 0.21 | 0.0441 | 0.009261 | 0.001945 | 0.000408 |
| 0.23 | 0.23 | 0.0529 | 0.012167 | 0.002798 | 0.000644 |
| 0.25 | 0.25 | 0.0625 | 0.015625 | 0.003906 | 0.000977 |
| 0.27 | 0.27 | 0.0729 | 0.019683 | 0.005314 | 0.001435 |
| 0.29 | 0.29 | 0.0841 | 0.024389 | 0.007073 | 0.002051 |
| 0.31 | 0.31 | 0.0961 | 0.029791 | 0.009235 | 0.002863 |
| 0.33 | 0.33 | 0.1089 | 0.035937 | 0.011859 | 0.003914 |
| 0.35 | 0.35 | 0.1225 | 0.042875 | 0.015006 | 0.005252 |
| MaxP | 14.336 | 23.552 | 32.768 | 41.984 | 51.2 |

| | |
|---|---|
| RTT | 0.05 |
| BW | 32768 |
| PS | 320 |
| POLLT | 0.04 |
| Limit | 0.01 |

*Fig. 14*

LINK LAYER ACKNOWLEDGEMENT AND RETRANSMISSION FOR CELLULAR TELECOMMUNICATIONS

BACKGROUND

1. Field of the Invention

The present invention pertains to mobile telecommunications, and particularly to acknowledgment of receipt and retransmission of packet switched data for an upper layer protocol, such as the transmission control protocol/Internet protocol (TCP/IP), for example.

2. Related Art and Other Considerations

Initially commercial mobile or cellular telecommunications systems were primarily employed for voice calls, e.g., circuit switched connections. In more recent years, however, cellular telecommunications systems have also been employed for the transmission of data (packet switched data), with the user equipment taking forms other than a mobile telephone. For example, user equipment such mobile laptops can send data over wireless links and through a cellular telecommunications system to wired computer networks such as the internet.

Cellular telecommunications systems employ a wireless link (e.g., air interface) between the (mobile) user equipment unit and a base station (BS). The base station has transmitters and receivers for radio connections with numerous user equipment units. One or more base stations are connected to (e.g., by landlines or microwave) and managed by a radio network controller (RNC) [also known in some networks as a base station controller (BSC)]. The radio network controller is, in turn, connected through control nodes to a core telecommunications network.

Control nodes can take various forms, depending on the types of services or networks to which the control nodes are connected. For connecting to connection-oriented, circuit switched networks such as PSTN and/or ISDN, the control node can be a mobile switching center (MSC). For connecting to packet switched data services such as the Internet (for example), the control node can be a gateway data support node through which connection is made to the wired data networks, and perhaps one or more serving nodes. Examples of a particular packet data service called the General Packet Radio Service (GPRS) [provided in Europe in the context of the Global System for Mobile communications (GSM)] are provided by the following (all of which are incorporated by reference): U.S. patent application Ser. No. 09/069,969 filed Apr. 30, 1998 entitled "Dynamic Allocation of Packet Data Channels"; U.S. patent application Ser. No. 09/069,939 filed Apr. 30, 1998 entitled "Allocation of Channels for Packet Data Services"; and U.S. patent application Ser. No. 09/090, 186 filed Jun. 4, 1998 entitled "Data Packet Radio Service With Enhanced Mobility Management".

As indicated above, packet switched data services can include Internet service. In terms of Internet connection, the transmission control protocol/Internet protocol (TCP/IP) has gained wide acceptance. Although usually functioning together, the internet protocol (IP) and transmission control protocol (TCP) are actually separate protocols, with the TCP being on a higher level (transport level) than the IP (on the network level).

There are numerous implementations of TCP, each with differing characteristics, the RENO implementation perhaps being the most common. In general, TCP supports a wide range of upper-layer protocols (ULPs). A ULP can send continuous streams of data through TCP. The TCP breaks the streams into encapsulated segments, each segment including appropriate addressing and control information. TCP passes the segments to the network layer (e.g., the IP).

The IP layer encloses the TCP segments in IP packets or Internet datagrams. It is the Internet datagram that enables routing to source and destination TCPs in other networks. Thus, the IP serves, e.g., to assemble IP datagrams and enable routing of the IP datagrams between IP addresses (e.g., between hosts) which are included in the IP datagram header.

TCP provides reliability which the IP lacks. In particular, the TCP carries out segmentation and reassembly functions of a datagram to match frame sizes and data-link layer protocols. In addition, TCP performs additional functions, such as addressing within a host, retransmission of lost packets, and flow control. General concepts undergirding TCP/IP are understood from numerous publications, including Freeman, *Telecommunication System Engineering*, Third Edition, John Wiley & Sons, Inc., (1996), and W.R. Stevens, *TCP/IP Illustrated, Volume I: The Protocols* (Addison-Wesley, 1994).

Data losses because of bit errors occur over conventional wired links, but such losses are so small as to be essentially non-existent (e.g., on the order of $10^{-6}$ over copper wire, and $10^{-9}$ over optical fiber). Such losses over conventional wired links stem almost exclusively from overflowing buffers in routers. TCP is designed to cope with these conditions, and consequently, packet losses are regarded as a congested network. Upon detection of loss, different implementations of TCP invoke different congestion avoidance mechanisms, but generally all such congestion avoidance mechanisms decrease the transmission speed.

Some code-type error recovery capability (e.g., convolutional coding) is provided over the air interface, but such code-type error recovery cannot cope with large errors. Over the air interface, error recovery is performed locally with a local retransmission protocol, wherein all data in a transmission buffer is cached until it has been successfully delivered to the receiver. In essence, any lost data is quickly transmitted by the local retransmission protocol before TCP has a chance to detect the loss. By retransmitting the data locally, faster recover can be done and, most importantly, the TCP will not detect the loss and accordingly will not invoke the TCP congestion avoidance mechanism (unless data is lost somewhere other than over the air interface).

Thus, the task using the local retransmission protocol is how to realize quickly that data is lost, and how to retransmit the lost data. Traditionally, two primary types of strategies in local recovery have been utilized: (1) transport layer recovery of TCP packets, and (2) link layer recovery of smaller data units called segments or frames (e.g., Automatic Repeat reQuest [ARQ]). Of the two general strategies, the ARQ-type of strategy is generally preferred.

Two examples of link layer recovery retransmission protocols are SSCOP (see ITU-T Recommendation Q.2110, 1994) and Radio Link Control (RLC). The SSCOP and RLC protocols are similar, with RLC being an improved variant of SSCOP. FIG. 13A illustrates a scenario of SSCOP operation, wherein segment $S2_{13A}$ is lost. Receipt of the next segment $S3_{13A}$ triggers a negative acknowledgment message (USTAT(S2)). Unfortunately, as illustrated in FIG. 13A, the negative acknowledgment message (USTAT(S2)) is lost. Moreover, segment $S5_{13A}$ is also lost. Transmission of segment $S6_{13A}$ therefore triggers a negative acknowledgment message (USTAT(S5)) to recover segment $S5_{13A}$. The negative acknowledgment message (USTAT(S5)) is successfully delivered to the transmitter, which then retransmits segment $S5_{13A}$. At this juncture, segment $S2_{13A}$ is still not recovered. When a poll timer maintained by SSCOP expires, a poll message is transmitted to the receiver by setting a poll bit in a header of segment $S9_{13A}$. Upon reception of poll message $S9_{13A}$, the receiver checks its reception buffer, and notices that segment $S2_{13A}$ is missing. Upon detection that segment $S2_{13A}$ missing, the transmitter transmits a STAT message, in particular STAT(S2). The STAT message is a selective acknowledgment message that can advise of gaps of one or more segments in the reception buffer. Upon reception of the STAT(S2) message, segment $S2_{13A}$ is retransmitted.

FIG. 13B illustrates a similar scenario of RLC operation, wherein segment $S2_{13B}$ is lost. Receipt of the next segment $S3_{13B}$ triggers both transmission of a negative acknowledgment message (USTAT(S2)) and starting of an EPC timer (Estimated PDU Counter) to protect the USTAT message from loss. But the USTAT(S2) message from the receiver is lost, as is the segment $S5_{13B}$ from the transmitter. The EPC timer expires in the third segment counting from where the USTAT(S2) message was sent, thereby triggering retransmission of the USTAT(S2) message. Although segment $S5_{13B}$ has also been lost, recovery of segment $S5_{13B}$ cannot begin until recovery of segment $S2_{13B}$ is completed. Therefore, the EPC timer is stopped and restarted (for the recovery of segment $S2_{13B}$). When the USTAT(S2) message succeeds and segment $S2_{13B}$ is received, the EPC timer is stopped and the reception buffer inspected. At this point segment $S5_{13B}$ is noted as missing, and a recovery is initiated with the USTAT(S5) message. The recovery of segment $S5_{13B}$ succeeds and the transmission of data packets can continue.

These two example link layer recovery retransmission protocols (SSCOP and RTL) can manage small losses fairly well, but as the Block Error Rate (BLER) grows, these two protocols are inadequate due to slow retransmission and transmission stalls resulting from filled transmission windows.

What is needed therefore, and an object of the present invention, is a link layer recovery technique which preserves good transmission utilization even during bad transmission conditions.

BRIEF SUMMARY OF THE INVENTION

A mobile telecommunications system comprises a mobile user equipment unit and at least one node through which a packet switched data session is established between the user equipment unit and a data network. One of the node and the user equipment unit serves as a transmitter of segments of data packets and the other of the node and the user equipment unit serves as a receiver of the segments of data packets. If a first lost segment is not retransmitted and successfully received within a timed interval, and if a second lost segment is also lost during the timed interval, at expiration of the timed interval the receiver sends an acknowledgment message to the transmitter, requesting retransmission of both the first lost segment and the second lost segment.

The acknowledgment messages of the system have a unique format which includes a starting sequence number field and a variable size bitmap. The start sequence number (ssn) is mapped to a first non-received segment in a receive buffer; the first bit in the bitmap maps to a segment with a sequence number equal to the start sequence number. Bits in the bitmap are set to a first predetermined value to indicate receipt of respective ones of the plural segments or to a second predetermined value to indicate non-receipt of respective ones of the plural segments. In differing embodiments, the bitmaps of the acknowledgment messages may have or may not have a stop bit. When a stop bit is used, the last bit set to the second predetermined value delineates the end of the information subset of the bitmap.

The transmitter has a poll timer that is started/restarted and canceled in accordance with novel timer operational rules. In particular, starting/restarting a poll timer in the transmitter upon occurrence of any of the following: (1) a sequence number of a segment to be sent from the transmitter to the receiver is greater than or equal to $V(a)$ +MaxWin −MaxP, wherein $V(a)$ is a sequence number of a first segment in a transmission window, MaxWin is the size of the transmission window, and MaxP is a predefined integer less than MaxWin; (2) one or more segments are to be retransmitted from the transmitter to the receiver if the poll timer is already running; and (3) a segment to be transmitted is the last segment in the buffer. The integer MaxP is dynamically determined, and can depend upon one of (1) a number of consecutive lost acknowledgment messages allowed; and (2) a frequency of negative acknowledgment messages. A time out value for the poll timer is also dynamically determined.

BRIEF DESCRIPTION OF THE DRAWINGS

The foregoing and other objects, features, and advantages of the invention will be apparent from the following more particular description of preferred embodiments as illustrated in the accompanying drawings in which reference characters refer to the same parts throughout the various views. The drawings are not necessarily to scale, emphasis instead being placed upon illustrating the principles of the invention.

FIGS. 10A–10D are diagrammatic views depicting differing scenarios of segment transmission, acknowledgments, and segment retransmission according to modes of the invention.

FIG. 13A and FIG. 13B are diagrammatic views depicting differing scenarios of segment transmission, acknowledgments, and segment retransmission according to prior art SSCOP and RLC protocols, respectively.

FIG. 14 is a matrix showing how MaxP can be set in accordance with the number of consecutive lost positive acknowledgment messages allowed

DETAILED DESCRIPTION OF THE DRAWINGS

In the following description, for purposes of explanation and not limitation, specific details are set forth such as particular architectures, interfaces, techniques, etc. in order to provide a thorough understanding of the present invention. However, it will be apparent to those skilled in the art that the present invention may be practiced in other embodiments that depart from these specific details. In other instances, detailed descriptions of well known devices, circuits, and methods are omitted so as not to obscure the description of the present invention with unnecessary detail.

Figure 1:
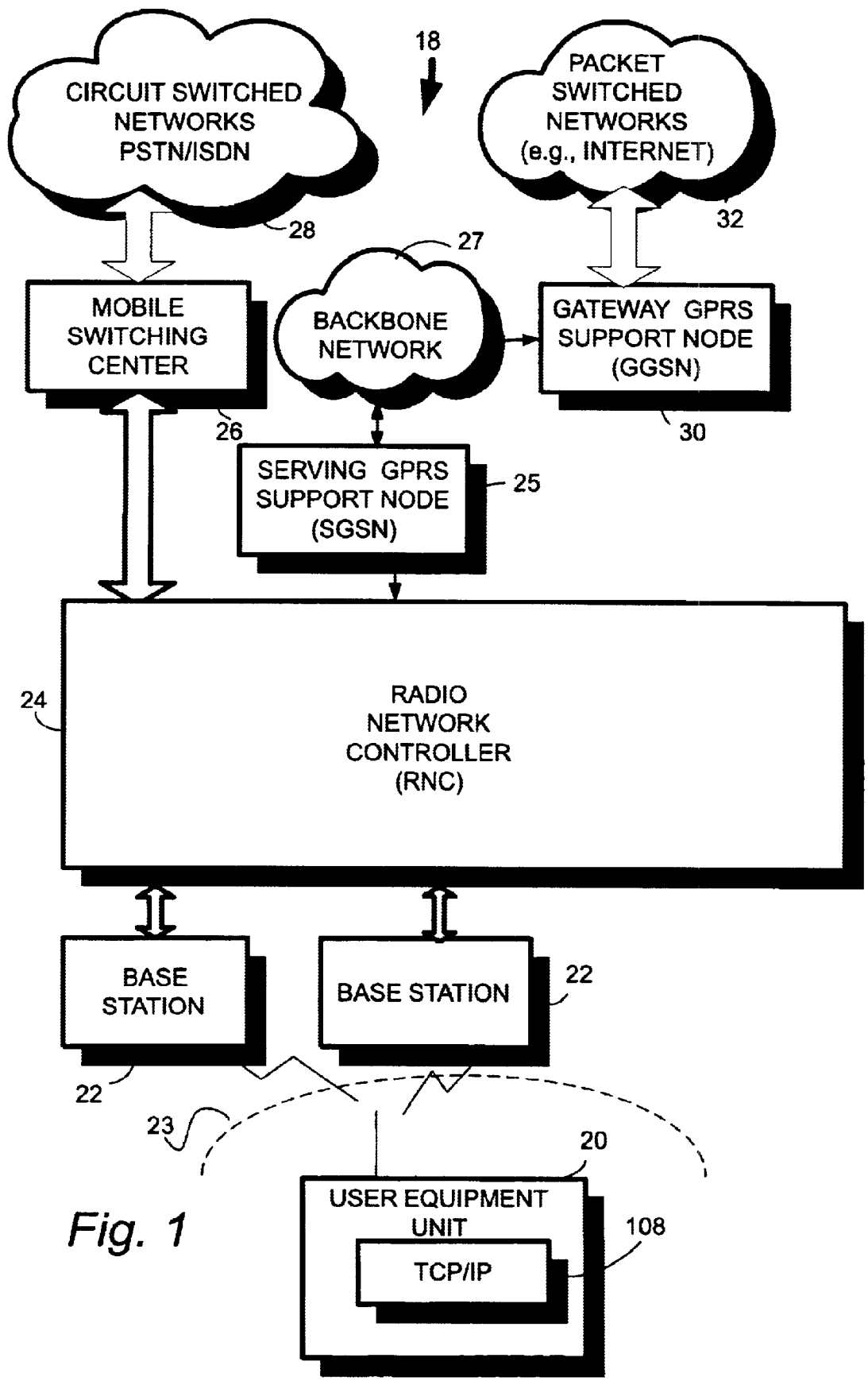
FIG. 1 is a schematic view of an embodiment of a telecommunications system which utilizes the present invention.

FIG. 1 shows a telecommunications network 18 in which a user equipment unit 20 communicates with one or more base stations 22 over air interface (e.g., radio interface) 23. Base stations 22 are connected by terrestrial lines (or microwave) to radio network controller (RNC) 24 [also known as a base station controller (BSC) in some networks]. The radio network controller (RNC) 24 is, in turn, connected through a control node known as the mobile switching center 26 to circuit-switched telephone networks (PSTN/ISDN) represented by cloud 28. In addition, radio network controller (RNC) 24 is connected to Serving GPRS Support Node (SGSN) 25 and through backbone network 27 to a Gateway GRPS support node (GGSN) 30, through which connection is made with packet-switched networks (e.g., the Internet, X.25 external networks) represented by cloud 32.

Gateway GRPS support node (GGSN) 30 provides the interface towards the external IP packet networks and X.25 networks. Gateway GRPS support node (GGSN) 30 translates data formats, signaling protocols and address information in order to permit communication between the different networks. Backbone network 27 is an Internet Protocol (IP) network. Serving GPRS Support Node (SGSN) 25 provides packet routing to an from a SGSN service area, and serves GPRS subscribers which are physically located within the SGSN service area. Serving GPRS Support Node (SGSN) 25 provides functions such as authentication, ciphering, mobility management, charging data, and logical link management toward the user equipment unit. A GPRS subscriber may be served by any SGSN in the network depending on location. The GPRS traffic is routed from the Serving GPRS Support Node (SGSN) 25 to base station controller (BSC) 24 and via base station (BS) 22 to user equipment unit 20. The functionality of Serving GPRS Support Node (SGSN) 25 and Gateway GRPS support node (GGSN) 30 may be combined in the same node, or may exist in separate nodes as shown in FIG. 1.

As understood by those skilled in the art, when user equipment unit 20 is participating in a mobile telephonic connection, signaling information and frames of user information from user equipment unit 20 are transmitted over air interface 23 on designated radio channels to one or more of the base stations 22. The base stations have radio transceivers which transmit and receive radio signals involved in the connection or session. For information on the uplink from the user equipment unit 20 toward the other party involved in the connection, the base stations convert the radio-acquired information to digital signals which are forwarded to radio network controller (RNC) 24. The radio network controller (RNC) 24 orchestrates participation of the plural base stations 22 which may be involved in the connection or session, since user equipment unit 20 may be geographically moving and handover may be occurring relative to the base stations 22. On the uplink, radio network controller (RNC) 24 picks frames of user information from one or more base stations 22 to yield a connection between user equipment unit 20 and the other party, whether that party be in PSTN/IDSN 28 or on the packet-switched networks (e.g., the Internet) 32.

Figure 2:
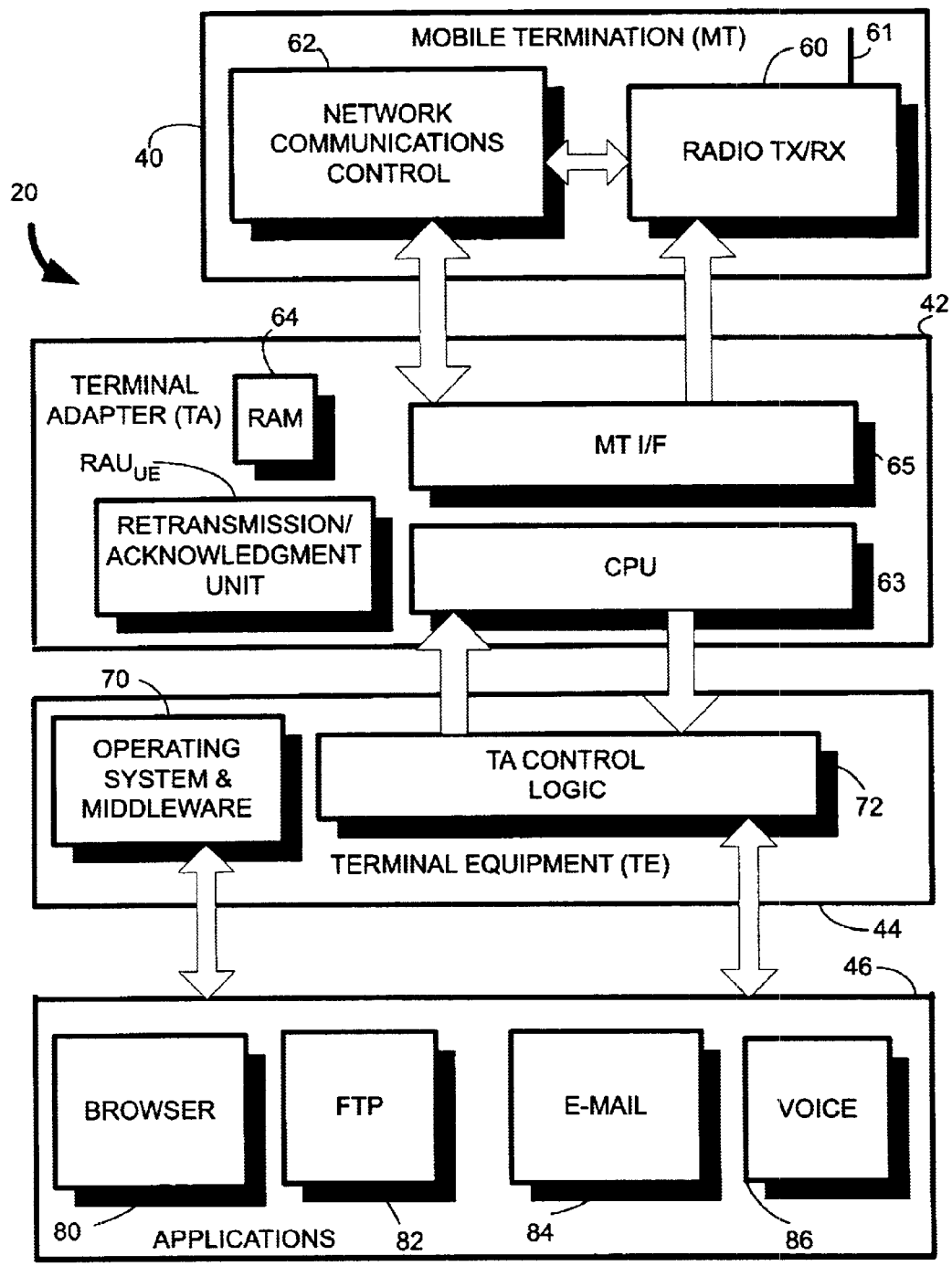
FIG. 2 is a diagrammatic view of functionalities provided in a mobile user equipment unit which participates in the telecommunications system of FIG. 1.

One type of a user equipment unit 20 with which the present invention is particularly useful is a computer with mobile termination, such as a laptop computer, for example. An illustrative embodiment of a suitable user equipment unit 20 for the present invention is provided in FIG. 2. As shown in FIG. 2, user equipment unit 20 has the following functional entities pertinent to the present invention: mobile termination entity (MT) 40; terminal adapter (TA) 42; terminal equipment 44; and a set 46 of applications. While each of these entities are described below, it should be understood that the invention is not confined to user equipment units having the same physical separation between functional entities, and that the present invention can be implemented in other than the described functional configuration.

Mobile termination entity (MT) 40, which is sometimes called the Mobile Equipment (ME), contains the radio transmitter/receiver TX/RX 60 (with antenna 61) and communications control 62 toward the network 18, e.g., the setup and release of radio connections, handover, etc. Mobile termination entity (MT) 40 can be a standard mobile pocket telephone (e.g., a GSM phone) or a phone card within user equipment unit 20.

Terminal adapter (TA) 42 acts as an adaptation between mobile termination entity (MT) 40 and the applications in the set 46 of applications. The terminal adapter (TA) 42 is typically realized as a Modem implemented on a PCMCIA (Personal Computer Memory Card International Association) card, which is inserted in a slot of terminal equipment 44. The terminal adapter (TA) 42 has a CPU 63 as well as a RAM 64 and a MT interface (I/F) 65.

Terminal equipment 44 is normally a small computer (or computer platform), and as such includes both hardware and software. Terminal equipment 44 thus has typical aspects of a computer platform, e.g., a processor an operating system and middleware (Internet protocol suits, for example), collectively illustrated by reference numeral 70 in FIG. 2. In addition, terminal equipment 44 has control logic 72 (executed by the processor) for controlling terminal adapter (TA) 42. Control logic 72 performs set-up and release of calls to and from the network 18.

As shown in FIG. 2, the set 46 of applications illustrated for the example embodiment includes an Internet browser 80; a file transfer program (FTP) 82; an E-mail program 84; and voice service 86.

Each application in set 46 is normally a program which is executed by the processor of terminal equipment 44 and which interacts with the user via, e.g., data input devices such as a keyboard and/or mouse and output or display devices. These applications typically can run on any personal computer (with or without radio access). The applications in set 46 use a number of application programming interfaces (APIs) towards the terminal equipment 44. One or several of these APIs is for communications with the network 18. Examples of APIs are Unix BSD Socket, WinSock or more telcom-specific APIs such as the Microsoft Intel Telephony API, AT&T, and Novell TSAPI or OnTheMove Mobile API. Thus, although the set 46 of applications is represented in FIG. 2 as an entity separate from terminal equipment 44, it should be understood that the set 46 of applications executed on the terminal equipment 44 if the terminal equipment 44 is a general computer, with the applications that are executed using the APIs offered by terminal equipment 44

Figure 3:
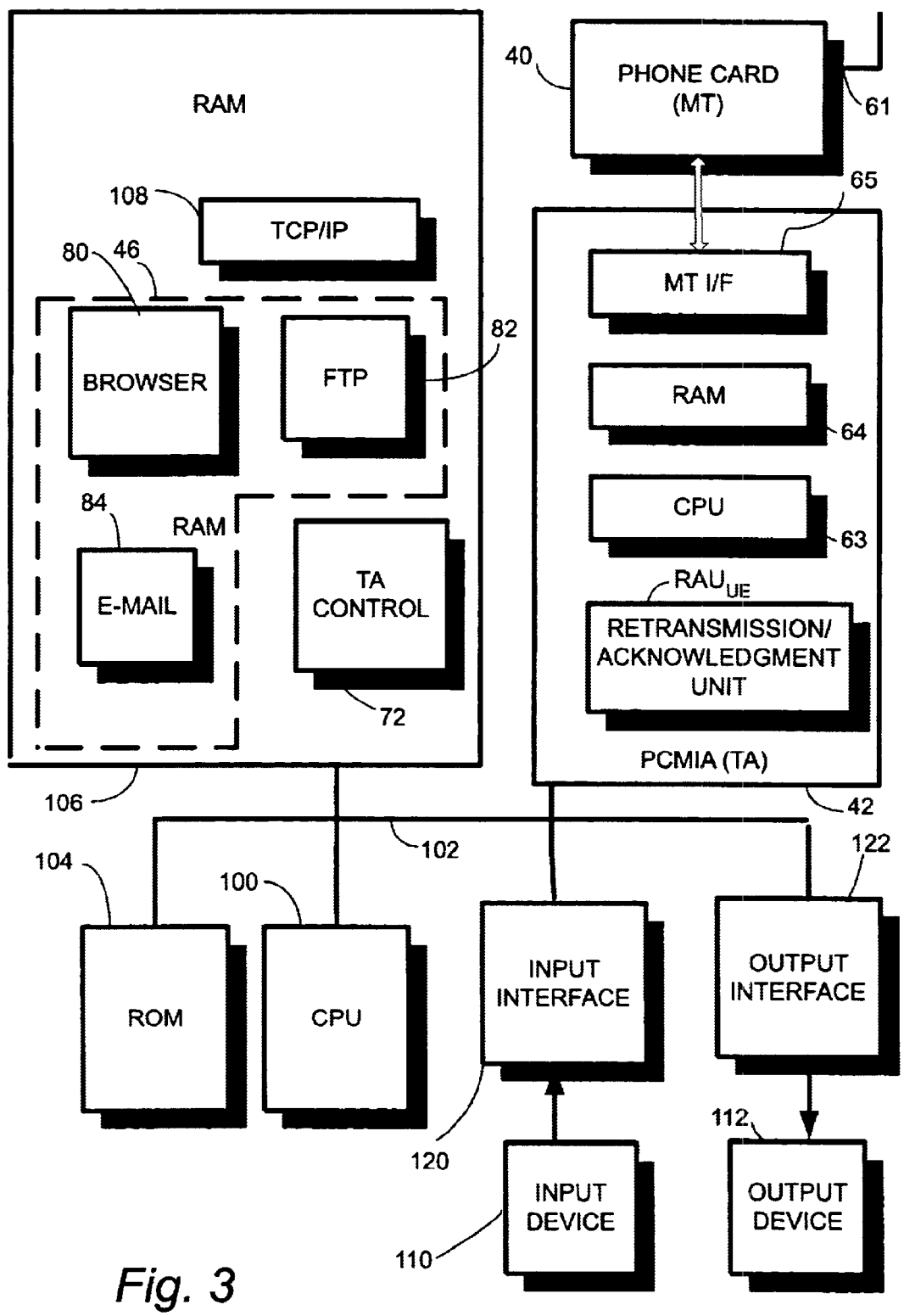
FIG. 3 is a schematic view of hardware components included in the mobile user equipment unit of FIG. 2.

FIG. 3 shows how the functional entities of mobile station as illustrated in FIG. 2 are mapped onto hardware components of mobile station 20. In essence, FIG. 3 shows terminal equipment 44 wherein mobile termination entity (MT) 40 and terminal adapter (TA) 42 are cards situated in card slots. Terminal adapter (TA) 42 is connected to central processing unit (CPU) 100 by bus 102. Mobile termination entity (MT) is connected to MT interface 65 of terminal adapter (TA) 42 by a cable. Memories of terminal equipment 44, particularly read only memory (ROM) 104 and random access memory (RAM) 106 are also connected to central processing unit (CPU) 100 by bus 102. In RAM 106 are stored the TA control logic 72, the set 46 of applications, and TCP/IP stack 108.

Terminal equipment 44 interfaces with a user through input device(s) 110 and output device(s) 112, each connected through respective appropriate interfaces 120 and 122 to bus 102. Input device(s) 110 can be a keyboard and/or mouse, for example, while output device(s) 112 can take the form of a display device, such as a LCD display panel, for example.

Figure 4:
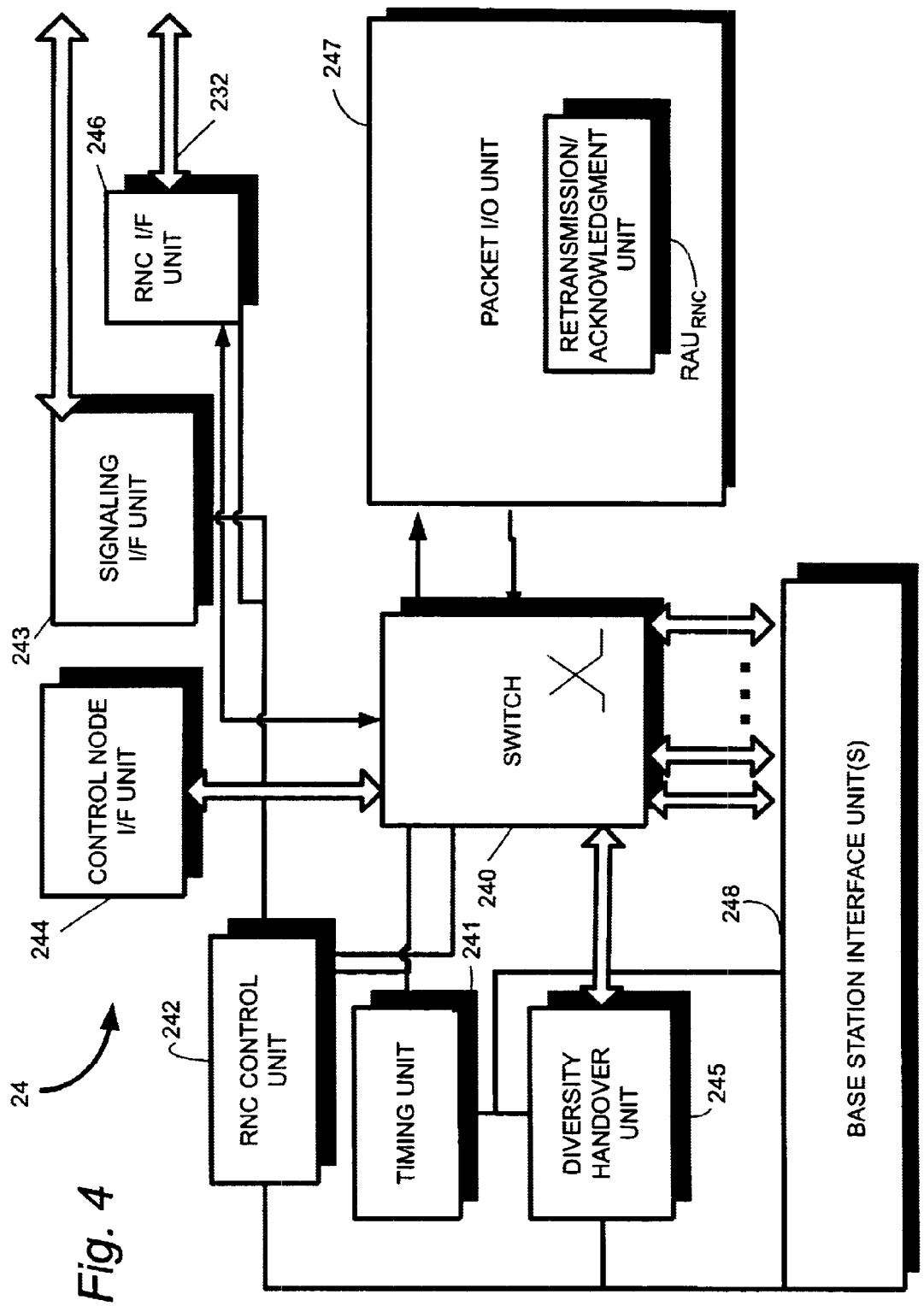
FIG. 4 is a schematic view of a radio network controller (RNC) node in accordance with an embodiment of the invention.
Figure 5:
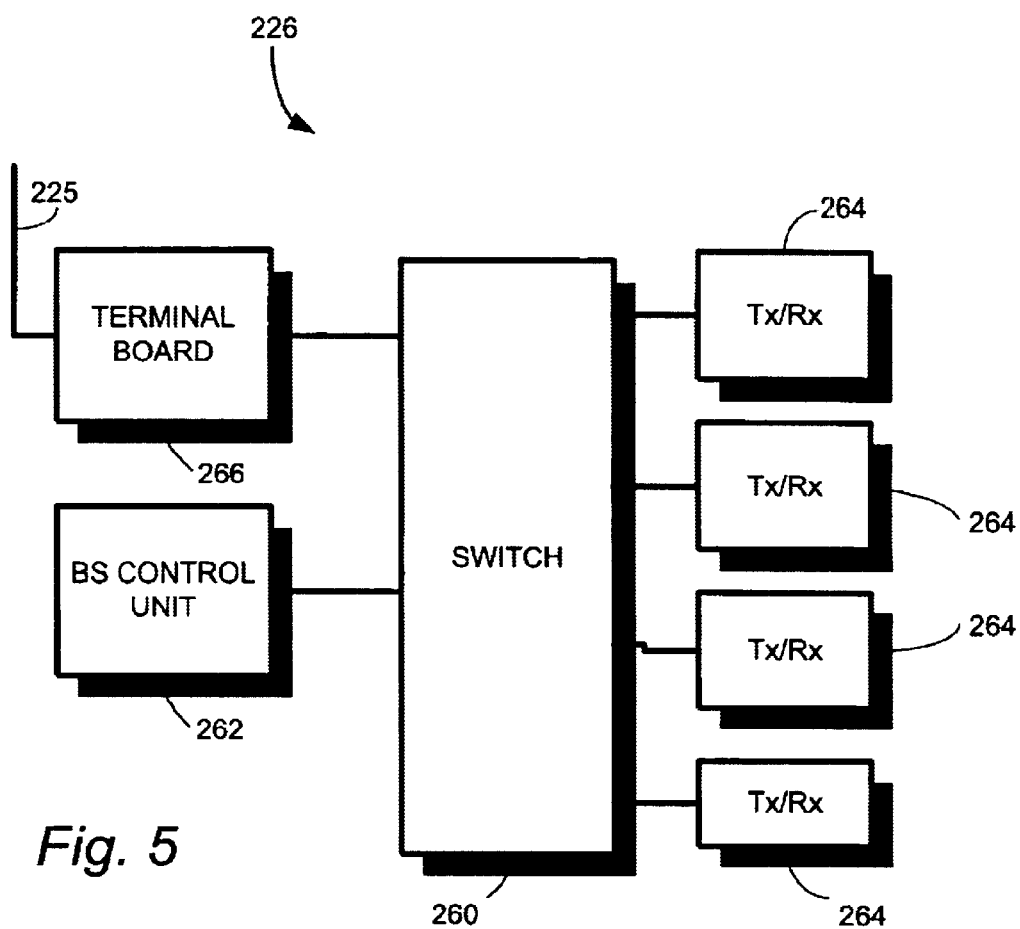
FIG. 5 is a schematic view of a base station (BS) node in accordance with an embodiment of the invention.

Further details of agn example radio network controller (RNC) 24 are shown in FIG. 4 as comprising a switch 24. Switch 240, which is controlled by RNC control unit 242, has a plurality of ports which are connected to various units and interfaces of radio network controller (RNC) 24. The RNC control unit 242 is connected to each element of radio network controller (RNC) 24, including timing unit 241; diversity handover unit (DHU) 245; and input/output unit 247. The radio network controller (RNC) 24 is connected to a signaling network via a signaling interface 243. The interfaces connected to ports of switch 240 include service node interface unit 244; RNC I/F unit 246; and base station interface units 248. The service node interface unit 244 is connected to the appropriate mobile switching center 26 and GRPS control node RNC interface unit 246 is connected by inter-RNC transport link 232to other (unillustrated) radio network controllers (RNCs) 24. Base station interface units 248 are connected to the base stations (BS) 22 served by radio network controller (RNC) 24. The input/output unit 247 and is connected to appropriate core ports of switch 240. The input/output unit 247 and a constituent channel switching unit thereof are described in more detail in companion United States patent application Ser. No. 09/441,883 filed simultaneously herewith and entitled "CHANNEL SWITCHING IN MOBILE TELECOMMUNICATIONS WITH TCP CONSIDERATIONS", and which is incorporated herewith by reference.

Transmissions over air interface (air link) 23 are typically bidirectional. That is, some data packet sessions are transmitted from user equipment unit 20 over air interface 23 toward packet switched networks 32 (e.g., uplink relative to user equipment unit 20); other data packet sessions are transmitted in the opposite direction from packet switched networks 32 to user equipment unit 20 (downlink relative to user equipment unit 20). Accordingly, both user equipment unit 20 and radio network controller (RNC) 24 have a link layer retransmission/acknowledgment unit RAU. In this regard, and as mentioned above, user equipment unit 20 has retransmission/acknowledgment unit $RAU_{UE}$ in its terminal adapter (TA) 42 (see FIG. 2 and FIG. 3). Similarly, the radio network controller (RNC) 24 has retransmission/acknowledgment unit $RAU_{RNC}$ in packet I/O unit 247 (see FIG. 4).

Figure 6:
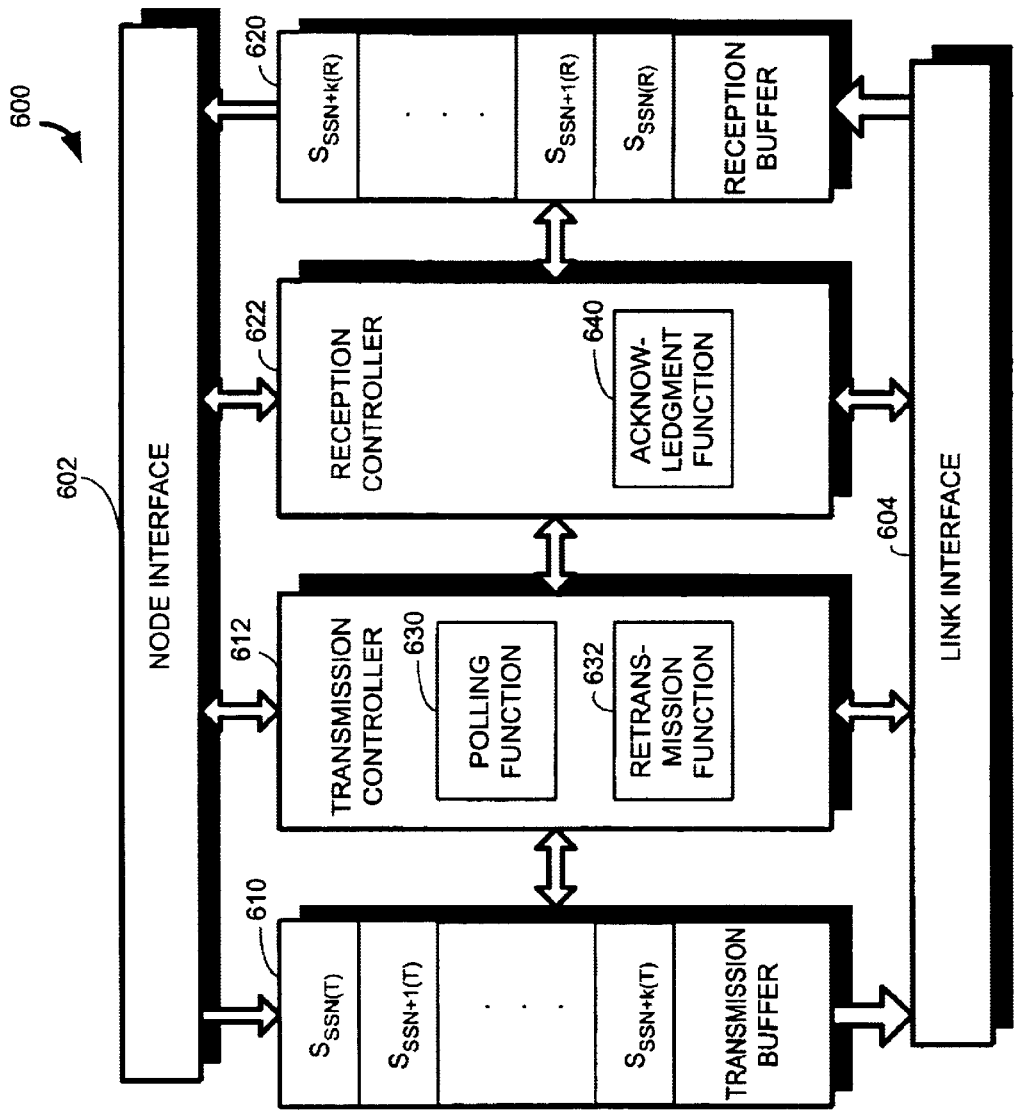
FIG. 6 is a schematic view of a retransmission/acknowledgment unit according to an embodiment of the invention.

Functionality included in a representative retransmission/acknowledgment unit RAU 600 is illustrated in FIG. 6. The retransmission/acknowledgment unit RAU 600 includes interface 602; link interface 604; transmission buffer 610; transmission controller 612; reception buffer 620; and reception controller 622. Depending on whether the retransmission/acknowledgment unit RAU 600 is employed in user equipment unit 20 or the node, the interface 602 is either an interface to the node or an interface to the remainder of the user equipment unit 20, respectively. Both transmission buffer 620 and reception buffer 620 are FIFO-type buffers. Segments being transmitted from interface 602 are stored in transmission buffer 610, under supervision of transmission controller 612, in route to link interface 604. Conversely, segments received from the link interface 604 are stored in reception buffer 620, under supervision of reception controller 622, in route to interface 602. Thus, at the moment shown in FIG. 6, transmission buffer 620 has TCP segments $S_{SSN(T)}$ through $S_{SSN+k(T)}$ stored therein, wherein in the subscript (1) SSN represents the start or first sequence number in the buffer, (2) "k" represents the size of the transmission buffer 610; and (3) the parenthetical T represents the transmit direction. The reception buffer 620 has TCP segments $S_{SSN(R)}$ through $S_{SSN+k(R)}$ stored therein, wherein in the subscript (1) SSN again represents the start or first sequence number in the buffer, (2) "k" represents the size of the reception buffer 620; and the parenthetical R represents the reception direction.

Figure 7A:
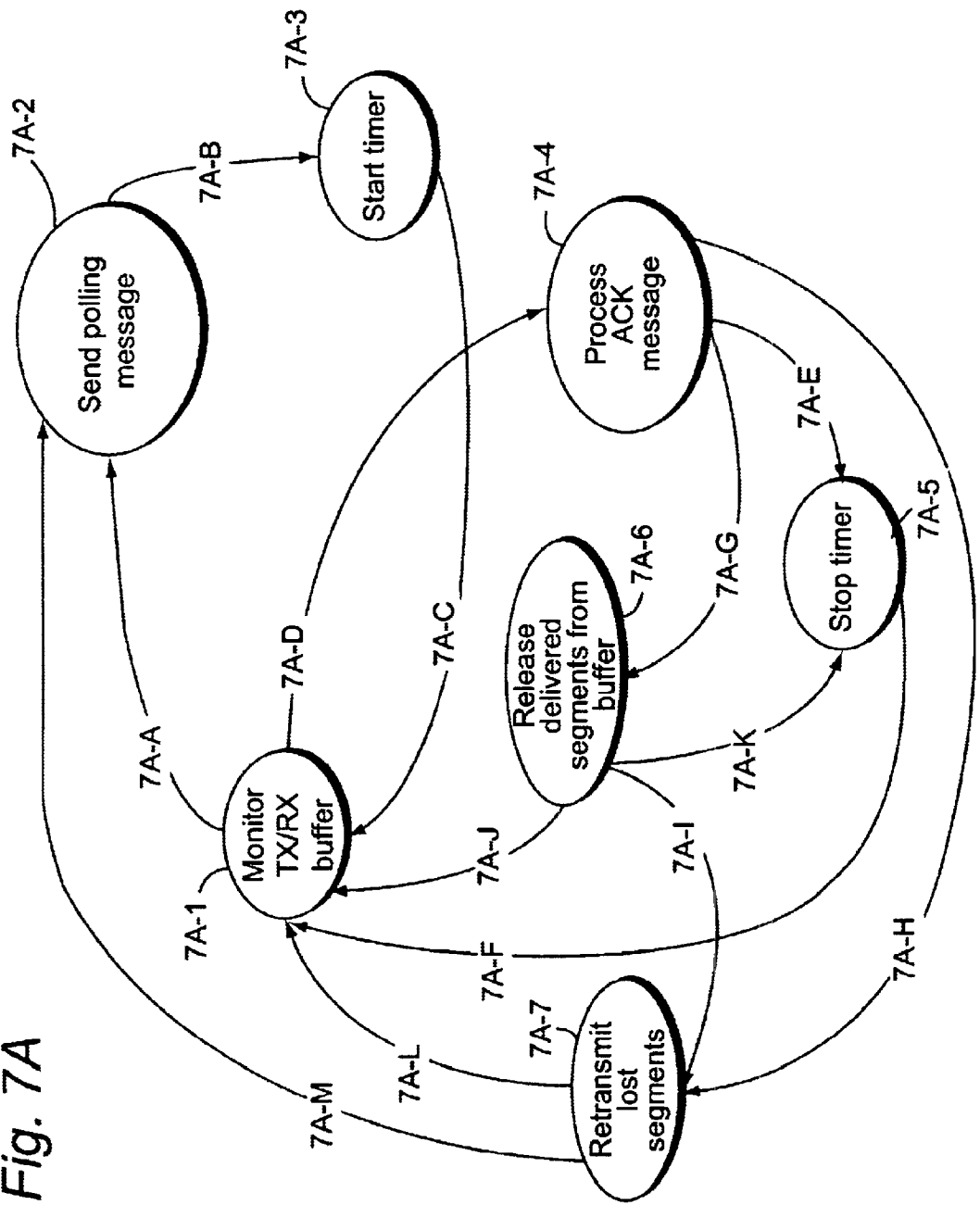
FIG. 7A is a state diagram showing operations on a transmitter side of the retransmission/acknowledgment unit of FIG. 6.
Figure 7B:
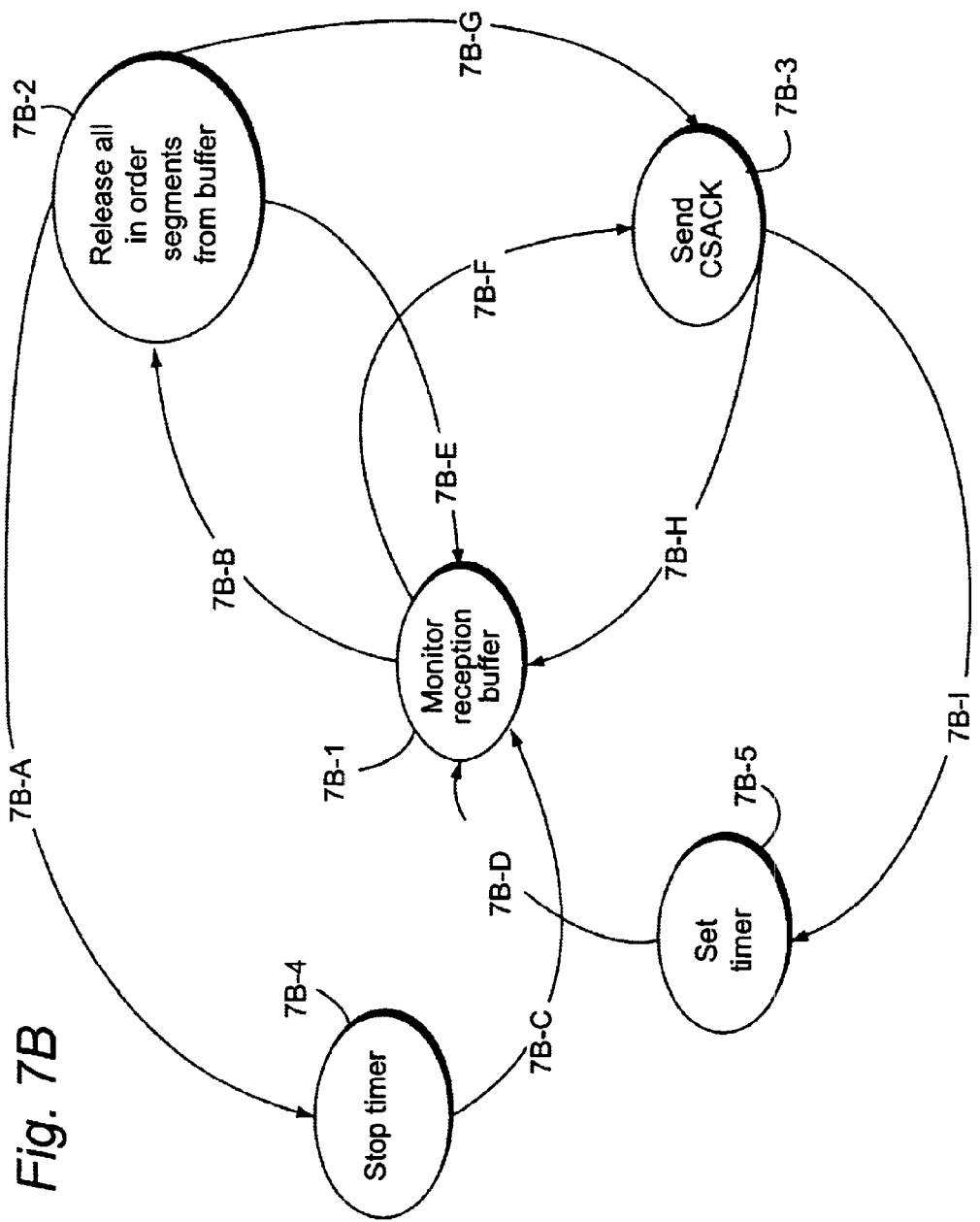
FIG. 7B is a state diagram showing operations on a receiver side of the retransmission/acknowledgment unit of FIG. 6.

As illustrated in FIG. 6, transmission controller 612 includes, among other things, both a polling function 630 and a retransmission function 632 pertinent to the present invention. Basic operations performed by transmission controller 612, including polling function 630 and retransmission function 632, are illustrated in FIG. 7A and described in conjunction therewith. The reception controller 622 includes an acknowledgment function 640 which is pertinent to the present invention. Similarly, basic operations performed by reception buffer 620 including the acknowledgment function 640 are illustrated in FIG. 7B.

One purpose of acknowledgment function 640 is to generate acknowledgment messages for transmission to the transmitter. In the present invention, there are three basic types of acknowledgment messages, all of which are indicated by the general notation CSACK. As used herein, the notation CSACK may some times contain an argument in the form CSACK(q), wherein q is a segment sequence number. The significance of the segment sequence number q depends on the type of acknowledgment message being sent. The three types of acknowledgment messages include: (1) a pure cumulative acknowledgment message in a normal situation (illustrated subsequently as message CSACK(a) in FIG. 8A); (2) a pure cumulative acknowledgment message sent upon receipt of a last segment in a transmission buffer (illustrated subsequently as message CSACK(x) in FIG. 8C); and (3) a selective acknowledgment message which occurs upon detection of a lost segment. The first two types of acknowledgment messages CSACK are also collectively referred to as "positive" acknowledgment messages CSACK in that no segment losses have been detected. As used herein, the phrase "transmission window" means a number of consecutive segments that can be transmitted before the transmitter requires receipt of an acknowledgment message from the receiver.

Figure 9A:
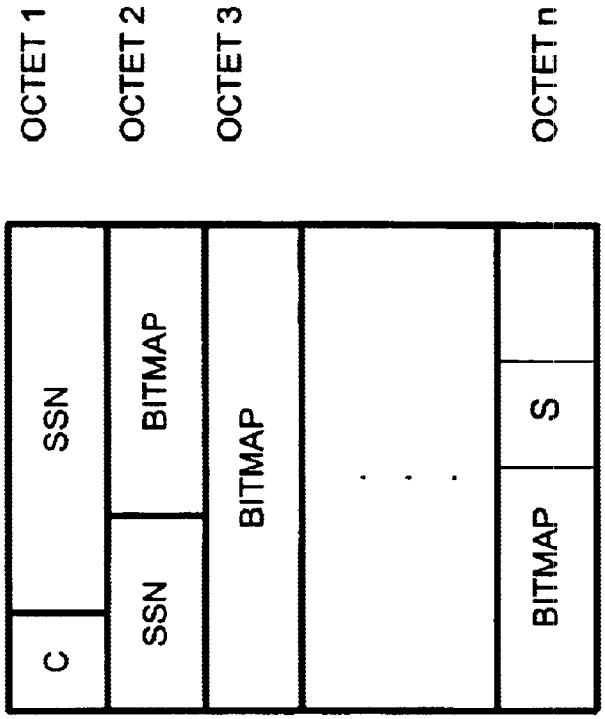
FIG. 9A is a diagrammatic view of a first example format of a acknowledgment message CSACK according to the invention.

All three types of acknowledgment messages CSACK of the present invention preferably have the same format. An example of the format for one embodiment of acknowledgment messages CSACK is illustrated in FIG. 9A. The acknowledgment message CSACK of FIG. 9A begins with a control message identification bit C in its first octet, which is followed in order by a start sequence number (ssn) and a bitmap. The start sequence number (ssn) bridges the first and second octets of the cumulative selective acknowledgment message. The bitmap is a variable size bitmap having bit positions corresponding to segments. The first bit of the bitmap corresponds to the start sequence number (ssn), a last of the bits in the bitmap is mapped to a start sequence number in the start sequence number field. Thus, the following rules are followed for the format of the acknowledgment message CSACK FIG. 9A: (1) the start sequence number (ssn) is always mapped to the first non-received segment in the receiver buffer; (2) a missing segment is denoted with a "1" in the bitmap; (3) received segments are denoted as "0" in the bitmap; and (4) the first bit in the bitmap maps to a segment with sequence number equal to the start sequence number (ssn). There is thus no stop bit in the bitmap of the acknowledgment message CSACK of FIG. 9A.

Figure 9B:
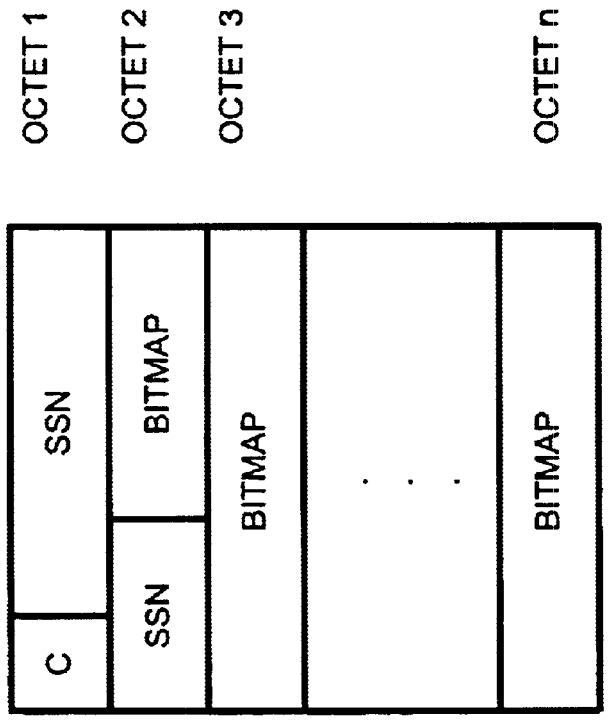
FIG. 9B is a diagrammatic view of a second example format of a acknowledgment message CSACK according to the invention.

An example of the format for another embodiment of acknowledgment messages CSACK is illustrated in FIG. 9B. Like the format of FIG. 9A, the format of FIG. 9B has a control message identification bit C, followed by a start sequence number (ssn), followed by a bitmap. The four rules for the format of FIG. 9A also apply to the format of FIG. 9B. In addition, the format of FIG. 9B also has the following format rules: (5) the first "1" counting from the end of the bitmap denotes the end of the valid part of the bitmap (and thus serves as a stop sequence number field, e.g., a stop bit); and (6) if the acknowledgment message CSACK has a fixed size and the bitmap is too large to fit in the bitmap field, the bitmap is truncated and the last bit in the truncated bitmap is set to "1". Thus, in contrast to the format of FIG. 9A, the format of FIG. 9B does employ a stop bit.

The acknowledgment messages CSACK occurring in transmissions between the RAUs of the radio network controller (RNC) 24 and the user equipment unit 20 must consistently be one of format of FIG. 9A or of the format of FIG. 9B. That is to say, between two units acknowledgment messages CSACK cannot mix the formats of FIG. 9A and FIG. 9B. The stop bit of FIG. 9B is particularly beneficial in enabling the transmitter to release selectively buffered segments. This feature can be needed if buffer size is critical, for example in small mobile applications with stream type data transfer. The stop bit is not needed in transmissions of burst type, for example TCP.

To illustrate the benefit of a stop bit (of the format of FIG. 9B), consider the following scenario: the CSACK bitmap size is limited to eight bits (the first bit being the leftmost), and that segments 1, 2, 3, 4, and 6–15 have been successfully transmitted. An acknowledgment message CSACK without the stop bit (the format of FIG. 9A) would request retransmission of segment 5 with the following format: ssn=5, bitmap=10000000. The only information this acknowledgment message CSACK can provide is that segment 5 has been lost, and that all segments up to and including segment 4 have been delivered. If the format of FIG. 9B (with the stop bit) is utilized, on the other hand, the acknowledgment message CSACK is as follows: ssn=5, bitmap =10000001. The acknowledgment message CSACK of the format of FIG. 9B in this scenario not only tells that segment 5 is lost and that the segments up to and including segment 4 have been delivered, but also indicates that segments 6–11 are properly delivered and can be removed from the transmission buffer. Note that although segments 12–15 are properly delivered, this acknowledgment message CSACK cannot report that fact because of its short bitmap size [see rule (5)]. With a larger bitmap, however, segments 12–15 could have been acknowledged. For example, if the bitmap size for the format of FIG. 9B were instead sixteen bits, the content of the acknowledgment message CSACK would be as follows: ssn=5; bitmap=10000000 00010000. This sixteen bit field enables the acknowledgment message CSACK to cover effectively all delivered segments and request retransmission of the lost segment 5.

In the ensuing discussion, the operations of FIG. 7A describe activities of transmission controller 612 for a transmitter retransmission/acknowledgment unit, while the operations of FIG. 7B pertain to activities of reception controller 622 for a receiver retransmission/acknowledgment unit. As mentioned above, depending upon the direction of the session, one of user equipment unit 20 and the radio network controller (RNC) 24 is the transmitter RAU, while the other of the user equipment unit 20 and the radio network controller (RNC) 24 is the receiver retransmission/acknowledgment unit RAU. Thus, although the following discussion of FIG. 7A and FIG. 7B refers to reference numerals of FIG. 6 with reference to both the transmitting and receiving operations, it should be understood that with respect to one direction of transmission the transmitting functions of FIG. 7A are performed in one equipment while the receiving functions of FIG. 7B are performed in another equipment.

Prior to discussing the operation of transmission controller 612 and reception controller 622, it should be mentioned that the transmission controller 612 in its polling function 630 has a poll timer. In general, the poll timer serves to ensure (1) that feedback is received from the receiver; and (2) that the last segment in a transmission window of the transmission buffer is delivered. The poll timer is never active unless a poll message has been sent. A poll message can be, and typically is, a segment in which a poll bit in the data header of the segment has been set. To avoid sending unnecessary poll messages, the poll timer must be canceled once the necessary information has arrived. This means that the poll timer should not expire if the requested feedback was lost. In the present invention, the poll timer is started (or restarted) when any one of three start/restart conditions occurs. In addition, when the poll timer is started (or restarted) a poll bit is set in a data header of the segment. The poll timer is canceled or stopped when either of two poll timer stop conditions occurs.

The first of the three alternative poll timer start/restart conditions is that the sequence number of the data packet to be transmitted is greater than or equal to Expression 1.

$$V(a) + \text{MaxWin} - \text{MaxP}. \qquad \text{Expression 1}$$

In Expression 1, V(a) is the sequence number of the first segment in the transmission window (e.g., the earliest or first un-acknowledged segment), MaxWin is the window size, and MaxP is a predefined integer less than MaxWin. In one test, MaxP was set to MaxWin/2, and MaxWin was set to 30. The first poll timer start/restart condition does not apply to restart the poll timer if it is already running.

Figure 8A:
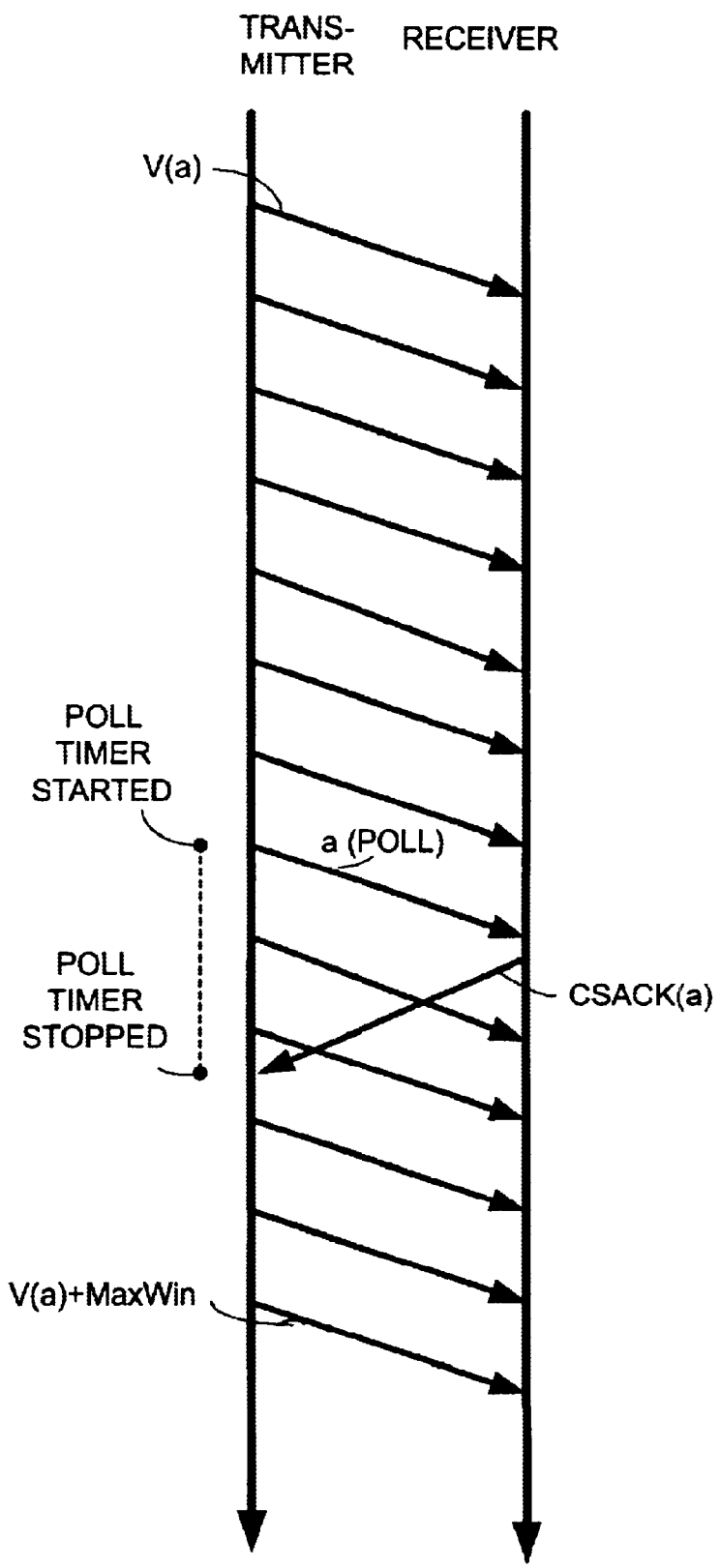
FIGS. 8A–8C are diagrammatic views depicting differing scenarios for three respective poll timer start/restart conditions.

A scenario depicting operation of the first poll timer start/restart condition is shown in FIG. 8A, wherein MaxWin is set to twelve and MaxP equals 5. The first non-acknowledgment segment is V(a). As shown in FIG. 8A, when the transmission reaches segment V(a)+7, the first poll timer start/restart condition is satisfied, so that the poll bit is set and the poll timer is started. When the acknowledgment message CSACK returns, it is a cumulative acknowledgment with no loss indications and SSN=V(a)+7.

Figure 8B:
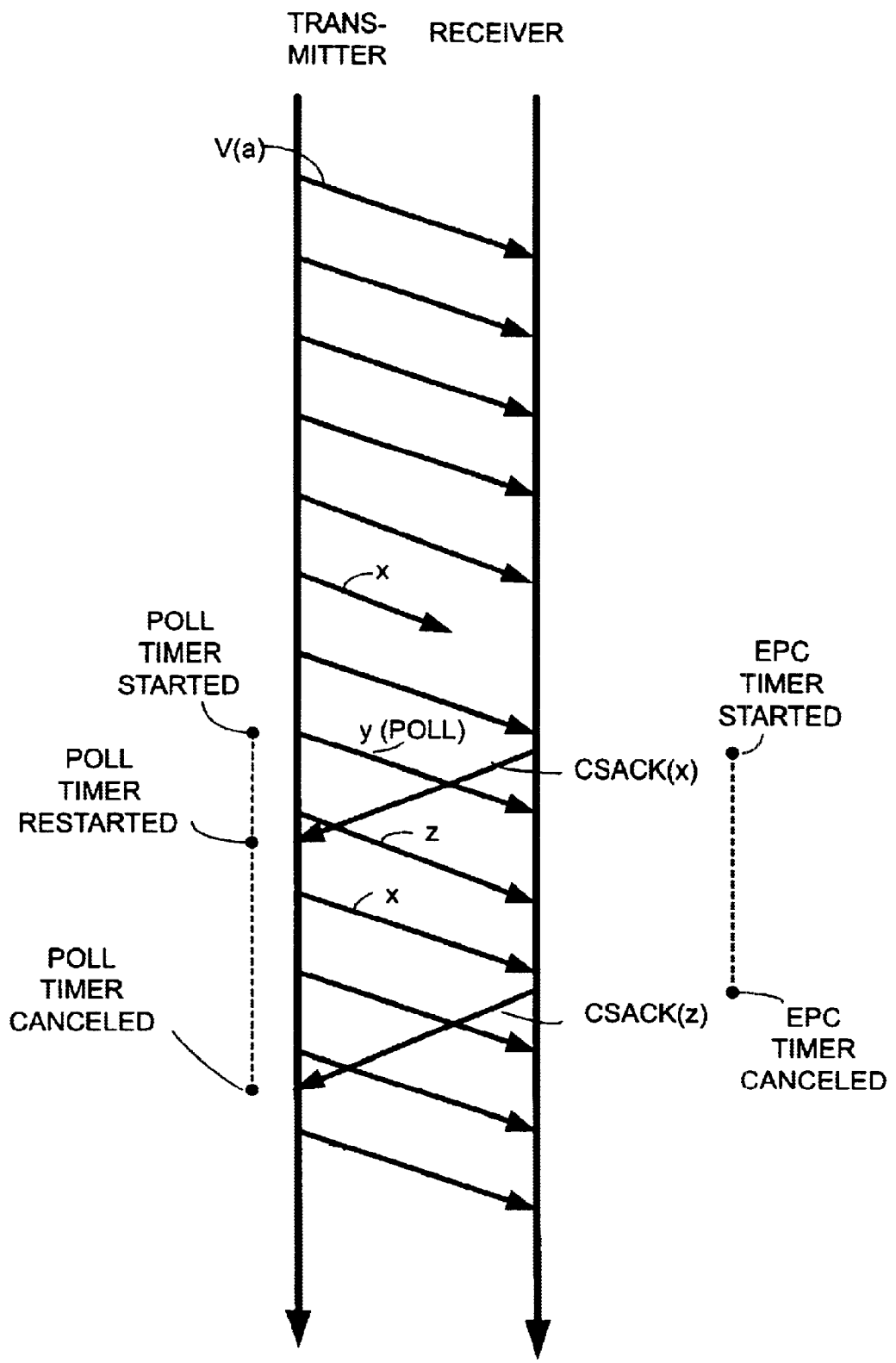

The second poll timer start/restart condition is the retransmission of one or more segments if the poll timer is already running. A scenario depicting operation of the first poll timer start/restart condition is shown in FIG. 8B. In FIG. 8B, segment x is lost. The next received segment triggers a CSACK message, particularly message CSACK(x). The EPC timer is then started. While the CSACK(x) message is in transit, the transmitter sends a poll message and starts a poll timer. Upon reception of the CSACK(x) message, the poll timer must be restarted so that the poll timer will not expire too soon. The poll bit of the retransmitted segment is also set. Note that a CSACK message is not sent on the poll message y, but instead segment x is awaited before the message CSACK(z) is sent to acknowledge all received segments. When CSACK(z) arrives, a second poll timer stop condition (discussed subsequently) is satisfied and the poll timer can be safely canceled.

Figure 8C:
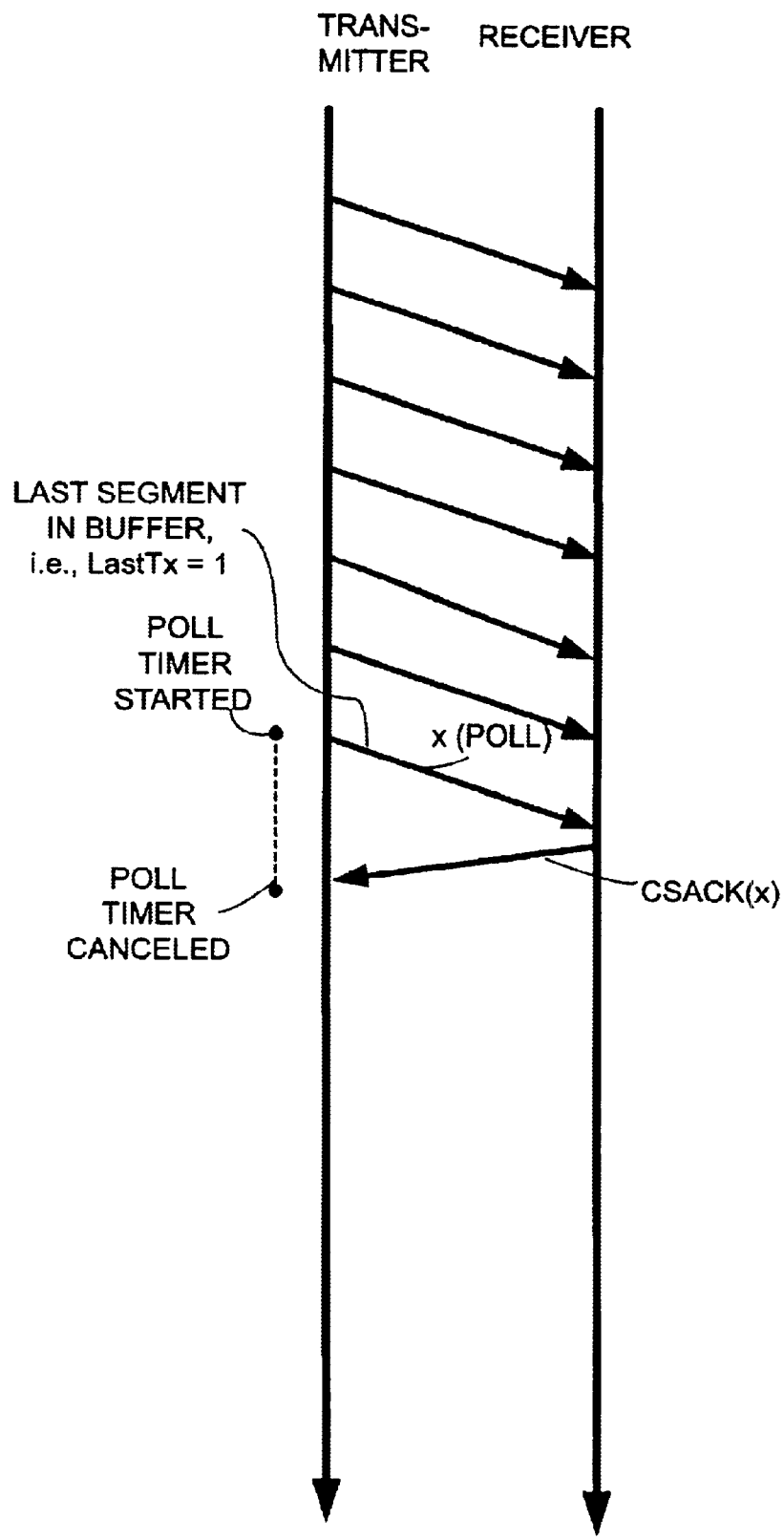

The third poll timer start/restart condition is that the segment to be transmitted is the last segment in the buffer, e.g., LastTx=1. A scenario depicting operation of the first poll timer start/restart condition is shown in FIG. 8C. In FIG. 8C, segment x is the last segment in the transmission buffer. Consequently, the LastTx flag in the segment is set. Accordingly, pursuant to the third poll timer start/restart condition, the poll timer bit is set and the poll timer is started. Upon reception of the acknowledgment message CSACK(x), a first poll time stop condition (discussed subsequently) is satisfied and the poll timer can be safely turned off.

The first poll timer stop condition occurs when (1) the last segment in the transmission buffer has been sent (e.g., LastTx=1), (2) a cumulative acknowledgment message has been received, and (3) the start sequence number field of the acknowledgment message CSACK is greater than the sequence number (Seqno) of the last transmitted segment. A scenario depicting operation of the first poll timer stop condition is shown in FIG. 8C, previously discussed.

The second poll timer stop condition occurs when (1) the segment to be transmitted is not a last segment in the transmission buffer (e.g., LastTx=0), and (2) any cumulative acknowledgment message is received which includes a start sequence number (ssn) which is greater than the first segment (V(a)) in the transmission window. Scenarios depicting operation of the second poll timer stop condition are shown in FIG. 8A and FIG. 8B.

The three alternative conditions which start or restart the poll timer, and the two stop conditions which cancel the poll timer, are herein also known as poll timer operational rules. The provision of the segmented acknowledgment message CSACK of the present invention, together with the poll timer and its associated poll timer operational rules, provides protection even with respect to pure cumulative acknowledgment messages and last segments transmitted from a transmission window. FIG. 7A shows basic operations performed by and states assumed by transmission controller 612 in furtherance of the present invention. State 7A-1 depicts transmission controller 612 as monitoring the filling of transmission buffer 610 with segments from interface 602 and then the reading out of segments from transmission buffer 610 to link interface 604. In similar manner, state 7B-1 shows reception controller 622 monitoring the filling of reception buffer 620 with segments from link interface 604 and the emptying of reception buffer 620 of segments being applied to interface 602.

Considering first the operation of the transmitter RAU as depicted in FIG. 7A, when either of the first or second poll timer start/restart rules (discussed above) are satisfied, the transmission controller 612 changes to state 7A-2 as indicated by event 7A-A in FIG. 7A. At state 7A-2 transmission controller 612 of the transmitter RAU sends a polling message to the receiver RAU. After sending the polling message of state 7A-2, transmission controller 612 automatically goes to state 7A-3 for the setting of the poll timer in its polling function 630, and then automatically returns to state 7A-1 for the monitoring of transmission buffer 610.

When the transmitter RAU receives an acknowledgment message CSACK from the receiver RAU as indicated by event 7A-D in FIG. 7A, transmission controller 612 goes from state 7A-1 to state 7A-4. At state 7A-4 transmission controller 612 processes the acknowledgment message CSACK. Upon receipt of the acknowledgment message CSACK, either of three courses of actions can be taken depending upon the type of acknowledgment message CSACK received (as indicated by its bitmap [see FIG. 9A or FIG. 9B]).

The first of the three potential course of action upon receipt of a pure cumulative acknowledgment message CSACK (positive CSACK) which occurs in a normal transmission situation. In other words, either of the two poll timer stop operation conditions/rules are met (as described above) and all segments up to the start sequence number specified in the acknowledgment message CSACK have already been released from transmission controller 612 In such case, as indicated by actions 7A–E transmission controller 612 stops the poll timer (at state 7A-5 ). The sending of the polling message is followed by restart of the poll timer at state 7A-3, and then transmission controller 612 resumes state 7A-1 as indicated by actions 7A–C and 7A–F.

A second of the three potential courses of action occurs upon receipt of a pure cumulative acknowledgment message CSACK triggered by receipt of the last segment in a transmission window. This second course of action is implemented if the start sequence number specified in the acknowledgment message CSACK is greater than the sequence number of the last segment released from transmission controller 612 In this second course of action, as indicated by arrow 7A–G in FIG. 7A transmission controller 612 goes to state 7A-6 to release the already-delivered segments (up to the segment having the start sequence number identified in the ssn field of the acknowledgment message CSACK) from transmission buffer 610. If the bitmap of the acknowledgment message CSACK indicates no segment losses, transmission controller goes back to state 7A-1 as indicated by arrows 7A–J and 7A–F. If either of the poll timer stop rules is satisfied, transmission controller 612 stops the poll timer (at state 7A-5 ) before returning to state 7A-1.

If, upon release of segments from transmission buffer 610, the bitmap of the acknowledgment message CSACK indicates one or more segment losses, transmission controller 612 goes to state 7A-7 as indicated by arrow 7A-I. At state 7A-7 transmission controller 612 retransmits the lost segments from transmission buffer 610 to receiver RAU. From state 7A-7, transmission controller 612 either goes to state 7A-1 (as indicated by arrow 7A–L) when the poll timer second start/restart operation rule is not met, or to state 7A-2 (as indicated by arrow 7A–M) when the poll timer second start/restart operation rule is met.

A third of the three potential courses of action occurs upon receipt of a selective cumulative acknowledgment message CSACK (negative CSACK) having a bitmap which indicates loss of one or more segments. In such case, as indicated by arrow 7A–H, transmission controller 612 goes to state 7A-7 for retransmitting the lost segment(s) from transmission buffer 610 to receiver RAU. As indicated above, from state 7A-7, transmission controller 612 either goes to state 7A-1 (as indicated by arrow 7A–L) when the poll timer second start/restart operation rule is not met, or to state 7A-2 (as indicated by arrow 7A–M) when the poll timer second start/restart operation rule is met.

Considering next the operation of the receiver RAU as depicted in FIG. 7B, when monitoring the reception buffer 620 at step 7B-1, upon receipt of an in-order segment the reception controller 622 transitions to state 7B-2 as indicated by arrow 7B-B.

If it is noted, upon release at state 7B-2 of all in order-segments from reception buffer 620, that there are no lost segments (or that all previously lost segments have been received), as indicated by arrow 7B-A reception controller 622 transitions to state 7B-4. At state 7B-4 reception controller 622 stops the receiver timer EPC, and then (as indicated by arrow 7B-C) returns to state 7B-1.

If, upon release at state 7B-2 of all in order-segments from reception buffer 620, it is noted that the last-received segment was a polling message (i.e., the poll bit is set in the received segment) and that the receiver timer EPC is not running, as indicated by arrow 7B–G the reception controller 622 transitions to state 7B-3 At state 7B-3, an acknowledgment message CSACK is generated by acknowledgment function 640 of reception controller 622 and sent to transmitter RAU, after which reception controller 622 transitions back to state 7B-1 as shown by arrow 7B–H. In so doing, acknowledgment function 640 of reception controller 622 generates a positive acknowledgment message CSACK.

If, upon release at state 7B-2 of all in order-segments from reception buffer 620, it is noted that the last-received segment was a polling message (i.e., the poll bit is set in the received segment), that the receiver timer EPC is running, and that not all lost segments have been recovered, as indicated by arrow 7B–E the reception controller 622 transitions back to state 7B-1.

The reception controller 622 transitions directly from state 7B-1 to state 7B-3 (as indicated by arrow 7B–F) upon occurrence of any of the four following situations: (1) one or more lost segments have been detected and the receiver timer EPC is not running; or (2) the receiver timer EPC is running and something other than a retransmitted segment (RTX) arrives at the transmitter RAU; or (3) the EPC timer has expired; or (4) the EPC timer is running, one or more lost segments have been detected, and a last retransmitted segment is received at transmitter RAU. The reception controller 622 transitions from state 7B-3 (the sending of the acknowledgment message CSACK) to state 7B-5 (as indicated by arrow 7B–I) when either (1) one or more lost segments have been detected and the receiver timer EPC is not running; or (2) the receiver timer EPC is running and something other than an RTX arrives at the transmitter RAU. At state 7B-5 the receiver timer EPC is set. After setting of the receiver timer EPC, reception controller 622 transitions from state 7B-5 state 7B-1 as indicated by arrow 7B–D.

Suppose that, in the process of the transmitter RAU sending segments from transmission buffer 620 to the receiver RAU, a segment is lost. For example, consider the scenario of FIG. 10A in which: (1) segment $S1_{10A}$ has been accurately transmitted from the transmitter to the receiver; (2) segment $S2_{10A}$ is lost (e.g., not received by the receiver); and (3) segment $S3_{10A}$ is received at the receiver RAU. In such a situation, in its monitoring of reception buffer 620 at state 7A-1 the reception controller 622 determines that a first lost segment is missing, i.e., segment $S2_{10A}$. Upon detecting the loss, reception controller 622 enters state 7B-3 In state 7B-3, the reception controller 622 of the receiver RAU sends a cumulative selective acknowledgment message CSACK $(S2)_{10A}$ to the transmitter RAU as indicated by message $CSACK(S2)_{10A}$ in FIG. 10A. In accordance with the format of FIG. 9B, the cumulative selective acknowledgment message $CSACK(S2)_{10A}$ of FIG. 10A would have the content: ssn=$(S2)_{10A}$; bitmap=101. In the bitmap of the cumulative selective acknowledgment message $CSACK(S2)_{10A}$ the first "1" indicates loss of segment $(S2)_{10A}$, the "0" indicates that segment $(S3)_{10A}$ was successfully received; and the last "1" indicates the end of the bitmap. If no stop bit is used in accordance with the format of FIG. 9A, the bitmap will be 10000. Moreover, upon sending the cumulative selective acknowledgment message $CSACK(S2)_{10A}$, reception controller 622 enters state 7B-5 to set the receiver timer EPC prior to returning to state 7B-1.

Upon receipt of the cumulative selective acknowledgment message $CSACK(S2)_{10A}$ of FIG. 10A, the transmitter RAU determines that the last segment reported by the cumulative selective acknowledgment message $CSACK(S2)_{10A}$ is two segments after $S1_A$, i.e., $S3_A$. The sequence numbers for all segments corresponding to the bits of the bitmap can be ascertained relative to the start sequence number (SSN) carried in the cumulative selective acknowledgment message.

Receipt of the cumulative selective acknowledgment message $CSACK(S2)_{10A}$ of FIG. 10A at the transmitter RAU causes transmission controller 612 to enter state 7A-4 for processing of the cumulative selective acknowledgment message $CSACK(S2)_{10A}$ (see FIG. 7A). In processing the cumulative selective acknowledgment message CSACK $(S2)_{10A}$ at state 7A-4, reception controller 622 notes from the bitmap the loss of segment $S2_{10A}$, and accordingly transitions to state 7A-7 for retransmission of segment $S2_{10A}$. After the retransmission of state 7A-7, the transmission controller 612 returns to state 7A-1. If the receiver RAU successfully receives the lost segment, reception controller 622 of the receiver RAU changes from state 7B-1 to state 7B-2, and upon noting release of all lost segments further stops the receiver timer EPC at state 7B-4 prior to returning to state 7B-1.

The situation described above with reference to FIG. 10A illustrates usage of the cumulative selective acknowledgment message CSACK to report loss of a single segment, e.g., usage of cumulative selective acknowledgment message $CSACK(S2)_{10A}$ to report loss of segment $S2_{10A}$. The cumulative selective acknowledgment messages of the present invention can also report the loss of multiple segments, as illustrated in FIG. 10B. In particular, upon arrival of segment $S5_{10}$ in FIG. 10B, the reception controller 622 of the receiver RAU realizes that segments $S2_{10B}$ through $S4_{10B}$ have not been received into reception buffer 620. Therefore, as shown in FIG. 10B, a cumulative selective acknowledgment message CSACK(S2,S3,S4)$_{10B}$ is sent at state 7B-3 from the receiver RAU to the transmitter RAU, with the cumulative selective acknowledgment message CSACK(S2,S3,S4)$_{10B}$ including in its bitmap indications that each of segments S2$_{10B}$ through S4$_{10B}$ have not been received. In other words, the content of the cumulative selective acknowledgment message CSACK(S2,S3,S4)$_{10B}$ for the format of FIG. 9B is ssn=(S2)$_{10B}$, bitmap=1111000; and for the format of FIG. 9A is ssn=(S2)$_{10B}$, bitmap= 1110000. Again, the particular segments reference by each bit of the bitmap is determined with reference to the start sequence number (ssn) of the cumulative selective acknowledgment message CSACK(S2,S3,S4)$_{10B}$.

Figure 10C:
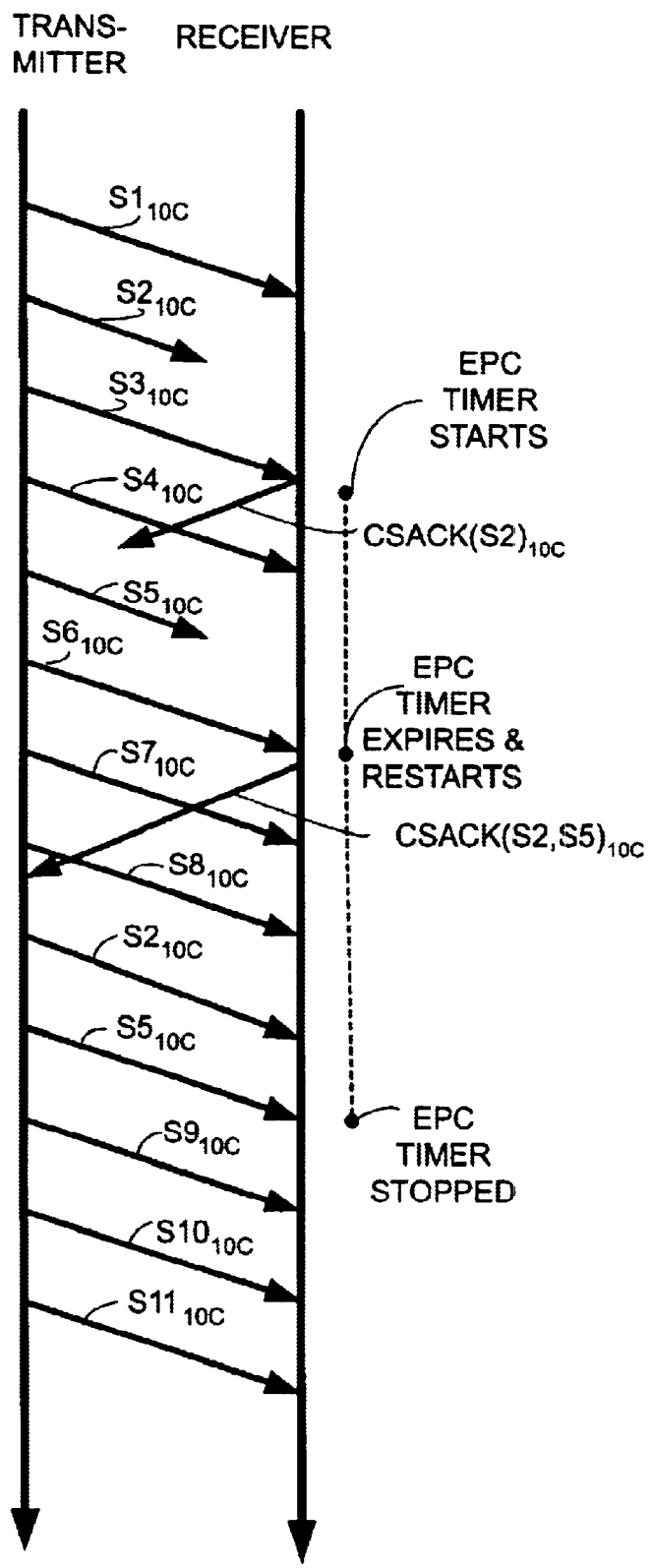

FIG. 10C depicts a situation which contrasts the operation of the present invention with the scenario depicted in FIG. 13A and FIG. 13B. In FIG. 10C, segment S2$_{10C}$ is lost. Receipt of the next segment S3$_{10C}$ triggers both transmission of a negative acknowledgment message (CSACK(S2)$_{10C}$) and starting of the receiver timer EPC to protect the (CSACK(S2)$_{10C}$) from loss. The negative acknowledgment message (CSACK(S2)$_{10C}$) is sent at state 7B-3, the timer EPC is set at state 7B-5 (see FIG. 7B). But the (CSACK (S2)$_{10C}$) message from the receiver RAU does get lost, as does the segment S5$_{10C}$ from the transmitter. The EPC timer expires in the third segment counting from where the (CSACK(S2)$_{10C}$) message was sent. Upon detecting that the EPC timer has expired, reception controller 622 again enters state 7B-3 to generate another acknowledgment message CSACK, and resets the EPC timer (at state 7B-5). The second acknowledgment message CSACK covers both lost segment S2$_{10C}$ and S5$_{10C}$, and is therefore denoted as CSACK(S2,S5)$_{10C}$. The acknowledgment message CSACK (S2,S5)$_{10C}$ has a content of ssn=(S2)$_{10C}$; bitmap= 100101000 for the format of FIG. 9B; and a ssn=(S2)$_{10C}$; bitmap=1001000 for the format of FIG. 9A. Upon reception of the acknowledgment message CSACK(S2,S5)$_{10C}$, at state 7A-7 the transmission controller 612 retransmits the lost segments S2 and S5. Upon successfully receiving the retransmission of the segments S2 and S5, the reception controller 622 releases the segments S2 and S5 from reception buffer 620 and stops the receiver timer EPC at state 7B-4. Thereafter, the reception controller 622 returns to state 7B-1 for the processing of further segments.

The situation of FIG. 10C with its delaying of reporting of the loss of segment S5$_C$ does result in delaying retransmission of segment S5$_{10C}$ for one or few frames. But as long as the transmission window is not closed, such delay does not affect overall performance. Depending on how many segments the preceding acknowledgment message concerns and what bandwidth is used, the delay can vary. Generally, the benefits of such bandwidth will more than offset the cost of such delay.

Figure 10D:
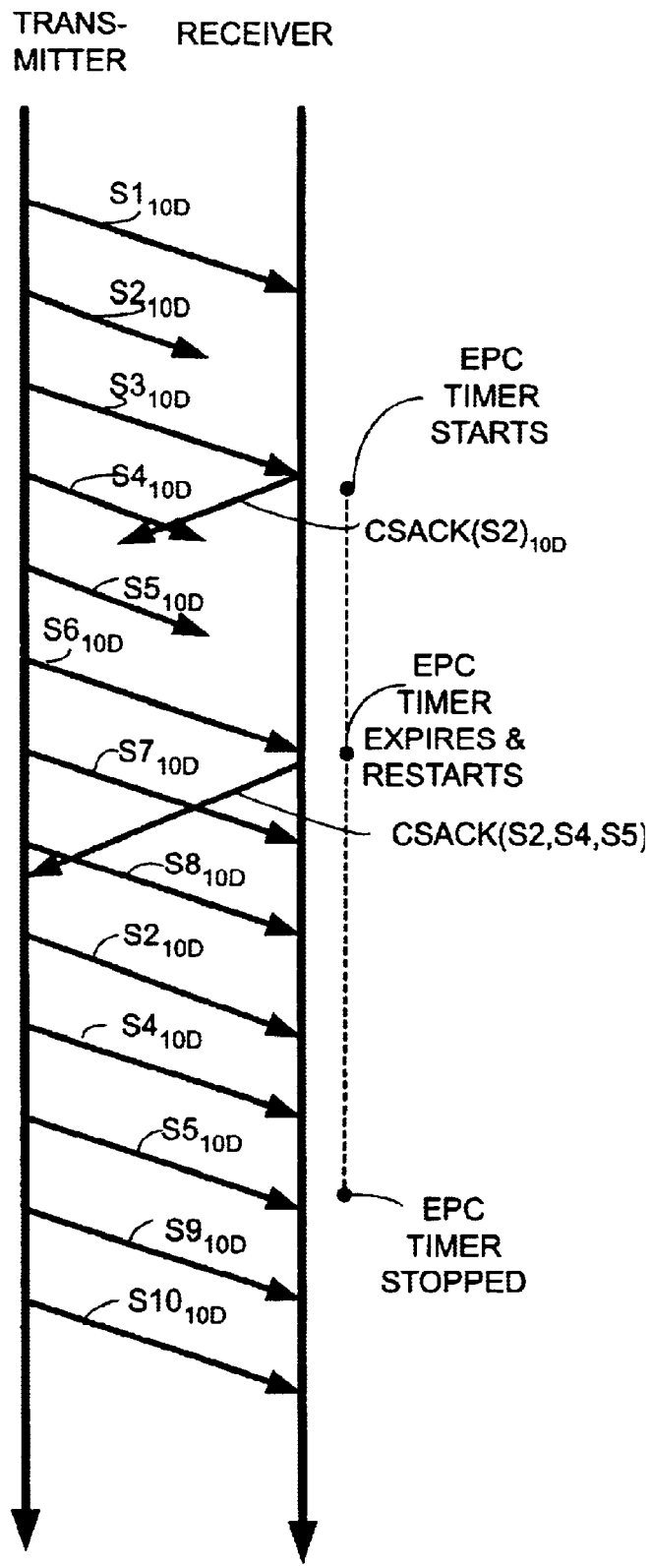

In the scenario of FIG. 10D, segment S2$_{10D}$ is lost, so that the reception of segement S3$_{10D}$ triggers a selective cumulative acknowledgment message CSACK(S2)$_{10D}$[at state 7B-3] and starts receiver timer EPC [at state 7B-4]. Segments S4$_{10D}$ and S5$_{10D}$ are also lost, as is the acknowledgment message CSACK(S2)$_{10D}$. When the receiver timer EPC expires, a transition from state 7B-1 to state 7B-3 occurs. At state 7B-3, the reception controller 622 inspects reception buffer 620 and determines that segments S2$_{10D}$, S4$_{10D}$, and S5$_{10D}$ are all missing. At state 7B-3 reception controller 622 sends another selective cumulative acknowledgment message CSACK(S2,S4,S5)$_{10D}$ and the receiver timer EPC is restarted. After retransmitted segments S2$_{10D}$, S4$_{10D,\ and\ S5\mathrm{10}D}$ are all received, the receiver timer EPC is canceled.

It should be noted that, in the FIG. 10D scenario, had CSACK(S2)$_{10D}$ been successfully transmitted and received, and the segment S2$_{10D}$ properly retransmitted and received, that the second selective cumulative acknowledgment message would have been message CSACK(S4,S5)$_{10D}$.

The foregoing illustrates a criteria of the present invention that, when a first segment is lost and an acknowledgment message CSACK has been generated, no subsequent segment losses are recovered until (1) the first segment has been recovered, or (2) the receiver timer EPC has expired. If the first segment is recovered, the receiver timer EPC is canceled. If the receiver timer EPC has expired, it cannot be cancelled. In both cases, the reception buffer 620 is inspected, and if any segments (expressly including segments other than the first segment) are detected as lost, all lost segments are included in one acknowledgment message CSACK and recovery is re-initiated.

The format of the acknowledgment message CSACK as explained in connection with FIG. 9A and FIG. 9B facilitates this operation and recovery.

The acknowledgment message format of FIG. 9A does not acknowledge gaps in the transmission window. In both the format of FIG. 9A and FIG. 9B, segments with sequence numbers up to and including the start sequence number (SSN) of the acknowledge message are released from the transmission buffer 310 upon reception of a cumulative selective acknowledgment message CSACK.

Various parameters of the invention can be made adaptable. As discussed below, these parameters include the MaxP value (employed in the Expression 1 of the first of the three alternative poll timer start/restart conditions), the time out or expiration value of the poll timer in transmission controller 612; and the time out or expiration value of the receiver timer EPC.

Recall that MaxP is a predefined integer less than MaxWin. It is advantageous to have an adaptive control scheme for determining the value of MaxP for several reasons. In a situation with high fault density on the air interface (e.g., many lost frames), setting MaxP to a high value means that there will be more time for recovery before the transmission stalls due to a full transmission window. On the other hand, with good radio conditions, setting MaxP to a low value means that feedback (e.g., acknowledgment messages) are not requested too often, thereby wasting less resources.

Thus, in one mode described with reference to FIG. 11, the present invention makes an estimate of the number of lost frames (the term "frame" being used interchangeably with "segment"), and based on that estimated value, sets the value of MaxP accordingly. As understood from the foregoing examples, a lost frame in the downlink direction (from the network to the user equipment) is detected by a gap in the sequence numbers of the received segments. Using the acknowledgment message CSACK of the invention illustrated as 11-1 in FIG. 11, the user equipment requests the radio network controller (RNC) 24 to re-send the lost segments. The acknowledgment message CSACK includes, in its bitmap (see the format of FIG. 9A and FIG. 9B) information regarding the number of segments that were lost since the last acknowledgment message CSACK was issued. The reception controller 622 can use this information regarding the number of lost segments to make an estimate of the block error rate (BLER). In this regard, and as shown as step 11-1 in FIG. 11, the estimate BLER(last) can be calculated as the number of lost segments as reported in the acknowledgment message CSACK divided by the number of segments transmitted from the transmitter RAU to the receiver RAU since the previous acknowledgment message CSACK was received. Then, as reflected by step 11-3 in FIG. 11, in order to smooth out the estimate of the BLER (last), a standard type of low pass filter can be used, as understood with reference to Expression (2).

$$BLER(\text{est}) = a * BLER(\text{last}) + (1-a) * BLER(\text{old}) \qquad \text{Expression (2):}$$

In Expression (2), BLER(old) is next previous calculation of BLER(last), and a is a parameter in the range of from 0 to 1. The parameter a is employed to control the responsiveness of the BLER estimate. In this regard, setting a equal to zero means that BLER(est) is not updated at all; setting a equal to one means that BLER(est) is equal to BLER(last). A value of a between zero and one gives a weighted sum of the last measured BLER [BLER(last)] and the previous estimate of BLER [e.g., BLER(old)]. Table 1 shows an example of calculating an on-going value of BLER(est) in which the parameter a is assigned a value 0.10 and the percentage of lost frames (i.e., BLER(last) alternates between 4% and 8%.

Figure 11:
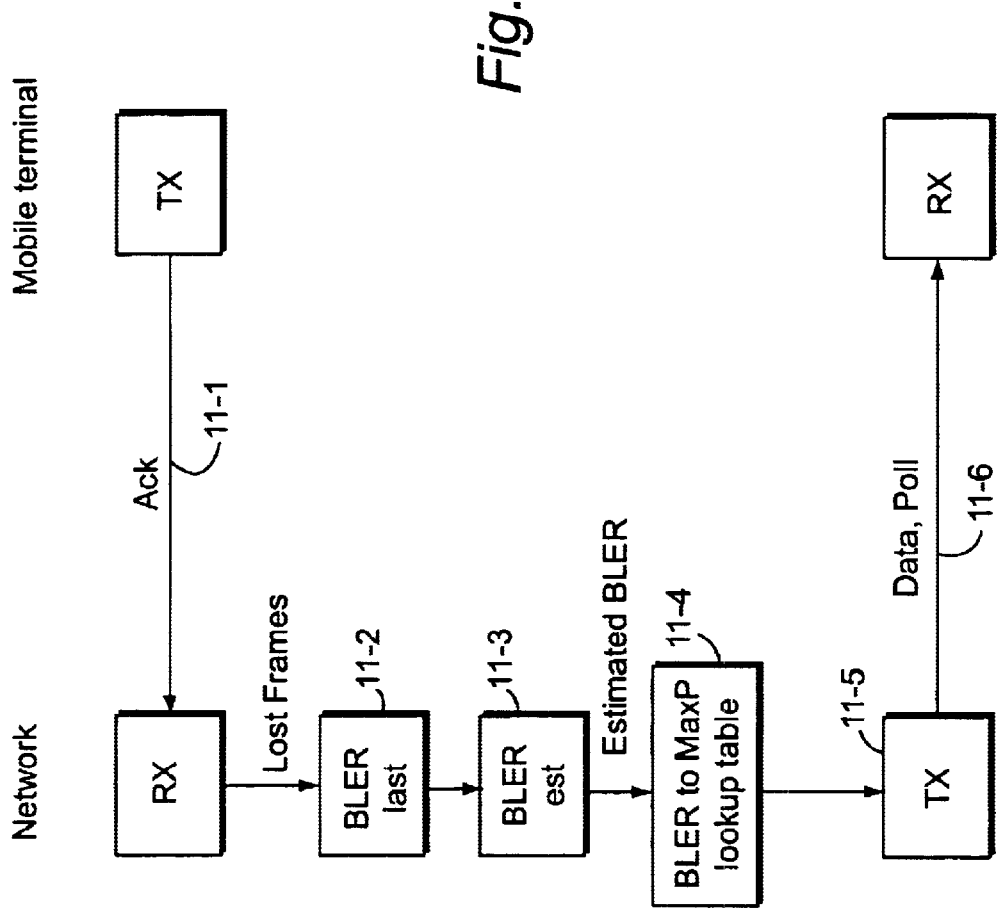
FIG. 11 is a diagrammatic view showing steps involved in adaptive control of determining a parameter MaxP according to a mode of the invention.

Using the BLER(est) value determined in a manner such as the foregoing, and as shown by step 11-3 in FIG. 11, a MaxP value can be selected. For example, transmission controller 612 can consult a lookup table and, using the BLER(est) value as an index, obtain a corresponding value for MaxP. The new MaxP value determined at step 11-4 can then be employed at step 11-5 as Expression 1 is evaluated to determined when a new poll message should be sent (as step 11-6) to the user equipment (e.g., mobile station). In general, the value for MaxP depends either on: (1) the number of consecutive lost positive acknowledgment messages allowed, keeping the risk for transmission stall low a certain limit (the lower the transmission stall limit is set, the larger MaxP grows); or (2) the frequency of negative acknowledgments (the higher the frequency of negative acknowledgments, the lower the MaxP value). FIG. 14 is a matrix showing how MaxP can be set in accordance with the number of consecutive lost positive acknowledgment messages allowed (i.e., criteria (1) mentioned above).

The risk for transmission stall (p) is calculated in accordance with Expression 3, in which N is set so that p is less than the limit. Expression (4) shows how to use N to calculate MaxP.

$$p = (BLER)^N \qquad \text{Expression (3)}$$

$$\text{Max}P = BW/PS * ((1+N) * RTT + N * POLLT) \qquad \text{Expression (4)}$$

In Expression (4), BW is bandwidth (in bits/second); PS is segment size (in bits), RTT is round trip time (in seconds), and POLLT is poll timer value (in seconds). In the example using N values corresponding to the shaded field in the matrix of FIG. 14 are safe for a given BLER. In FIG. 14, RTT (round trip time )=0.05 seconds; BW (bandwidth)= 32768 bits/second; PS (segment size)=320 bits; and POLLT (poll timer value)=0.04 seconds. For example, at 19% BLER, N=3 produces a safe MaxP value of 33. If the negative acknowledgments are taken into consideration, the MaxP value can be decreased.

Figures 12A, 12B:
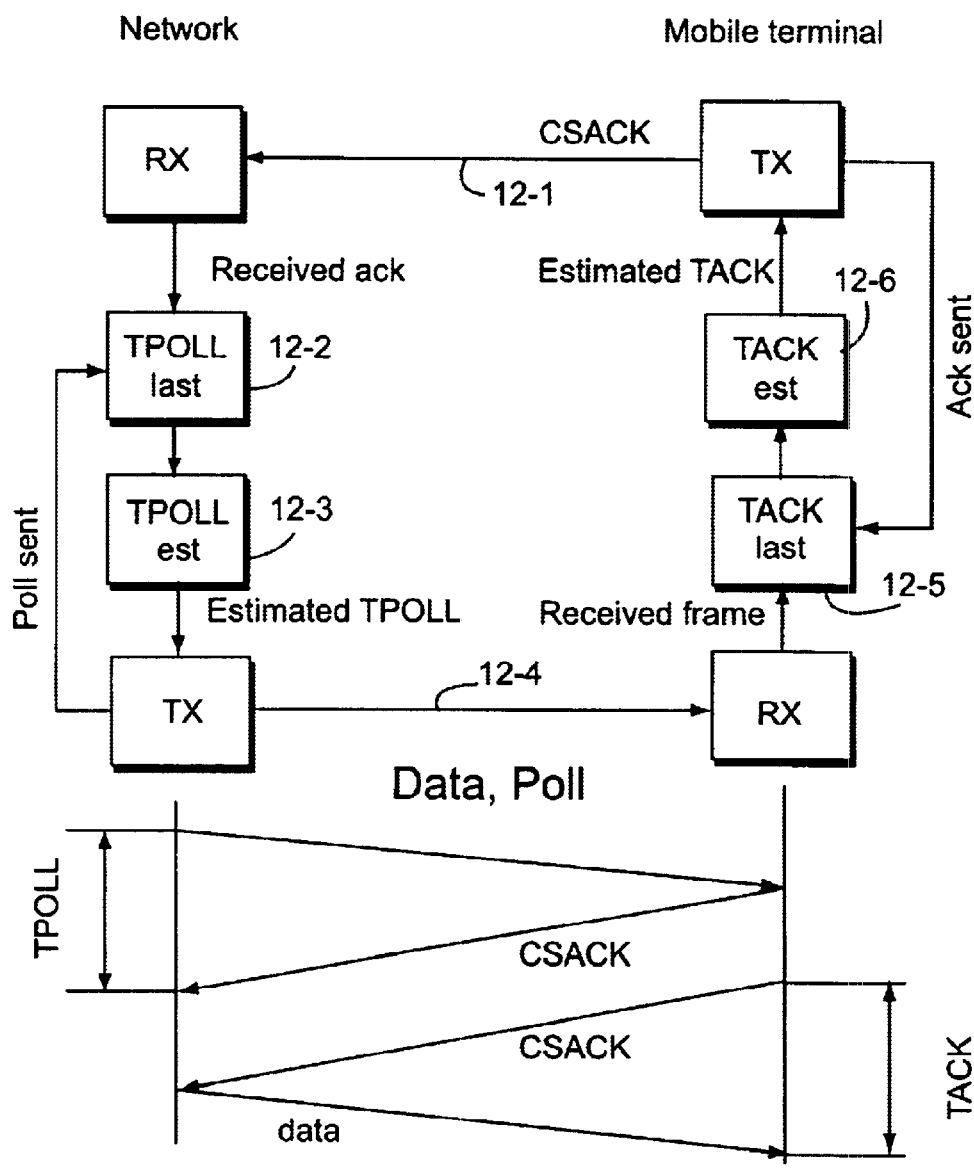
FIG. 12A and FIG. 12B are diagrammatic views showing steps involved in adaptive control of determining time out values for a poll timer and a receiver timer according to a mode of the invention.

The time out or expiration value of the poll timer in transmission controller 612 and the time out or expiration value of the receiver timer EPC can also be adaptively controlled, as illustrated in FIG. 12A. Thus far, no transport delays (except the delay introduced by the air interface) have been taken into consideration. However, delays can occur in the transport network as well as processing delays in the nodes involved (e.g., the base station node 22; the radio network controller (RNC) 24, and the user equipment). It is advantageous to set the time out values of the poll timer and receiver timer EPC to accommodate these transport network delays and processing delays.

As shown in FIG. 12A and FIG. 12B, the receiver RAU (e.g., the receiver in the situation depicted in FIG. 12) measures the time interval from sending of a acknowledgment message CSACK (at step 12-1) to the time that a re-transmitted segment covered by acknowledgment message CSACK is received (step 12-4). The measured time interval is used as a value for TACK(last) [step 12-5], which is employed (at step 12-6) to develop an estimate TACK(est) using similar low pass filtering techniques as above described with reference to BLER. The estimate TACK(est) is then used for the new time out or expiration value for the receiver timer EPC.

The acknowledging strategy of the invention requires only one timer (EPC) in the receiver, but such timer should be adjustable accurately regardless of bandwidth changes and regardless of how many segments are to be retransmitted. Any type of timer works so long as it satisfies the criteria of adjustable accuracy regardless of (1) bandwidth changes, and (2) how many segments are to be retransmitted.

Concerning the time out value for the poll timer, the transmitter RAU (which, in the case of FIG. 12A, resides in the network) measures the time interval between the sending of a poll message and receipt of a corresponding acknowledgment message CSACK (see FIG. 12B). The measured time interval is used as a value TPOLL(last) [step 12-2], which is employed (at step 12-3) to develop an estimate TPOLL(est) also using similar low pass filtering techniques as above described with reference to BLER. The estimate TPOLL(est) is then used for the new time out or expiration value for the poll timer. It is to be noted that the measurements are re-initiated if the poll timer is restarted.

The present invention uses a polling acknowledgment strategy together with a loss-driven acknowledgment strategy. In accordance with the present invention, when segments are not lost very frequently, acknowledgment messages are sent often enough to provide good feedback, but yet still seldom enough to avoid unnecessary load on the acknowledgment link. Then, as the loss grows, loss driven acknowledgment takes over the responsibility of providing enough feedback to the transmitter. In this regard, the cumulative selective acknowledgment message provides feedback to the transmitter regarding which segments have been lost and which segment in the transmission buffer can be removed (e.g., released). To minimize band width needs, the cumulative selective acknowledgment message should generally be as small as possible.

The loss driven acknowledgment of the present invention thus provides bandwidth advantage. With an effective restraining mechanism, the protocol can keep down the amount of transmitted acknowledgment messages while still providing enough feedback. Combining the restraining mechanism with cumulative selective acknowledgment messages provides a robust and economic acknowledgment strategy.

By using the poll and acknowledgment strategy of the present invention, the performance of a link layer retransmission protocol can persist even during extremely lossy conditions. This means that satisfactory end-to-end TCP performance can be obtained even when the system is under very heavy load.

The aggressive acknowledgment cuts down the retransmission time of lost acks, especially in extreme-loss situations. The poll-ack mechanism ensures that no stalls except those resulting from massive loss (i.e., all segments are lost) will occur. Using a loss-adaptive polling mechanism minimizes the amount of requested acks at all times, while still holding the link utilization as high as possible.

The acknowledgment format of FIG. 9A makes buffer deallocation trivial as no selective algorithm is needed.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims. For example, whereas the transmission controller 612 and reception controller 622 have herein been illustrated as two separate controllers for sake of clarity, it should be understood that the functions of transmission controller 612 and reception controller 622 can instead be performed by a single controller.

TABLE 1

| BLER (last) % | BLER (old) % | BLER (est) % |
|---|---|---|
| 0.00 | 0.00 | 0.00 |
| 4.00 | 0.00 | 0.40 |
| 8.00 | 0.40 | 1.16 |
| 4.00 | 1.16 | 1.44 |
| 8.00 | 1.44 | 2.10 |
| 4.00 | 2.10 | 2.29 |
| 8.00 | 2.29 | 2.86 |
| 4.00 | 2.86 | 2.97 |
| 8.00 | 2.97 | 3.48 |
| 4.00 | 3.48 | 3.53 |
| 8.00 | 3.53 | 3.98 |
| 4.00 | 3.98 | 3.98 |
| 8.00 | 3.98 | 4.38 |
| 4.00 | 4.38 | 4.34 |
| 8.00 | 4.34 | 4.71 |
| 4.00 | 4.71 | 4.64 |
| 8.00 | 4.64 | 4.97 |
| 4.00 | 4.97 | 4.88 |
| 8.00 | 4.88 | 5.19 |
| 4.00 | 5.19 | 5.07 |
| 8.00 | 5.07 | 5.36 |
| 4.00 | 5.36 | 5.23 |
| 8.00 | 5.23 | 5.50 |
| 4.00 | 5.50 | 5.35 |
| 8.00 | 5.35 | 5.62 |
| 4.00 | 5.62 | 5.46 |
| 8.00 | 5.46 | 5.71 |
| 4.00 | 5.71 | 5.54 |
| 8.00 | 5.54 | 5.79 |

What is claimed is:

1. A mobile telecommunications system comprising:
   a mobile user equipment unit;
   at least one node through which a packet switched data session is established between the user equipment until and a data network;
   wherein one of the node and the user equipment unit servers as a transmitter of segments of data packets and the other of the node and the user equipment unit serves as a receiver of the segments of data packets; and
   wherein the receiver, upon arrival of a segment which is sequenced to a first lost segment, detects loss of the first lost segment and, in response to the arrival and detection of the loss, sends a first acknowledgment message to the transmitter, and wherein if (1) the first lost segment is not received within a timed interval initiated in conjunction with detection of the loss of the loss of the first lost segment and (2) the receiver subsequently determines that a second lost segment has been lost during the timed interval, at expiration of the timed interval the receiver sends a second acknowledgment message to the transmitter, the second selective acknowledgment message indicating loss of both the first lost segment and the second lost segment.

2. The system of claim 1, further comprising a timer which times the timed interval, the timer being adjustable.

3. The system of claim 2, wherein if the receiver determines that further lost segments have been lost during the timed interval, the second selective acknowledgment message also indicates loss of the further lost segments.

4. The system of claim 1, wherein at least one of the first acknowledgment message and the second acknowledgment message includes a start sequence number field and a bitmap field, wherein the start sequence number is mapped to a first non-received segment; and wherein bits in the bitmap field are set to a first predetermined value to indicate receipt of respective ones of the plural segments or to a second predetermined value to indicate non-receipt of respective ones of the plural segments.

5. The system of claim 4, wherein the bitmap field of at least one of the first acknowledgment message and the second acknowledgment message does includes a stop sequence number field.

6. The system of claim 5, wherein the stop sequence number field is a stop bit.

7. The system of claim 5, wherein if the bitmap is too large to fit in the bitmap field, the bitmap is truncated and the last bit in the truncated bitmap is set to the second predetermined value.

8. The system of claim 1, wherein the transmitter comprises:
   a buffer for storing segments to be transmitted to the receiver;
   a poll timer, and wherein the poll timer is started/restarted when any of the following occur:
   (1) a sequence number of a segment to be sent from the transmitter to the receiver is greater than or equal to V(a)+MaxWin−MaxP, wherein V(a) is a sequence number of a first segment in a transmission window, MaxWin is the size of the transmission window, and MaxP is an integer less than MaxWin;
   (2) one or more segments are to be retransmitted from the transmitter to the receiver if the poll timer is already running;
   (3) a segment to be transmitted is a last segment in the buffer.

9. The system of claim 8, wherein the integer MaxP is dynamically determined.

10. The system of claim 8, wherein the integer MaxP depends on a number of consecutive lost acknowledgment messages allowed.

11. The system of claim 10, wherein MaxP is determined by the following expression:

$$\text{Max}P=BW/PS*((1+N)*RTT+N*POLLT)$$

wherein BW is bandwidth; PS is segment size, RTT is round trip time, and POLLT is a poll timer value, and N is set to provide a risk for transmission stall p below a limit.

12. The system of claim 8, wherein the integer MaxP depends on a frequency of negative acknowledgment messages.

13. The system of claim 8, wherein a time out value for the poll timer is dynamically determined.

14. The system of claim 8, wherein the poll timer is canceled if:
   (1) a segment to be transmitted is the last segment in the transmission buffer; and
   (2) an acknowledgment message has been received which has a start sequence number field which is greater than the sequence number of the last transmitted segment.

15. The system of claim 8, wherein the poll timer is canceled if:
   (1) a segment to be transmitted is not a last segment in the transmission buffer; and
   any acknowledgment message is received which includes a start sequence number which is greater than the first segment (V(a)) in the transmission window.

16. A method of operating a mobile telecommunications system comprising at least one node through which a packet switched data session is established between a user equipment unit and a data network, the method comprising:
   using one of the node and the user equipment unit to serve as a transmitter of segments of data packets and using the other of the node and the user equipment unit to serve as a receiver of the segments of data packets;
   upon arrival of a segment which is sequenced subsequent to a first lost segment, detecting loss of the first lost segment;
   in response to the arrival and detection of the loss, sending a first acknowledgment message from the receiver to the transmitter; and
   when (1) the first lost segment is not received within a timed interval initiated in conjunction with the detection of the loss of the first lost segment and (2) a second lost segment is subsequently lost during the timed interval, the method further comprises sending from the receiver, at expiration of the timed interval, a second selective acknowledgment message to the transmitter, the second selective acknowledgment message indicating loss of both the first lost segment and the second lost segment.

17. The method of claim 16, wherein a timer times the timed interval, and wherein the method further comprises adjusting the timer.

18. The method of claim 16, further comprising, if further lost segments are lost during the timed interval, using the second selective acknowledgment message also to indicate loss of the further lost segments.

19. The method of claim 16, further comprising formatting at least one of the first acknowledgment message and the second acknowledgment message to include a start sequence number field and a bitmap field, wherein the start sequence number is mapped to a first non-received segment; and wherein bits in the bitmap field are set to a first predetermined value to indicate receipt of respective ones of the plural segments or to a second predetermined value to indicate non-receipt of respective ones of the plural segments.

20. The method of claim 19, further including formatting the bitmap field of at least one of the first acknowledgment message and the second acknowledgment message to include a stop sequence number field.

21. The method of claim 20, further including formatting the bitmap field to include a stop bit as the stop sequence number field.

22. The method of claim 19, further including formatting the bitmap field whereby if the bitmap is too large to fit in the bitmap field, the bitmap is truncated and the last bit in the truncated bitmap is set to the second predetermined value.

23. The method of claim 16, wherein the transmitter comprises a buffer for storing segments to be transmitted to the receiver and a poll timer, and further comprising starting/restarting the poll timer upon occurrence of any of the following:
   (1) a sequence number of a segment to be sent from the transmitter to the receiver is greater than or equal to V(a)+MaxWin−MaxP, wherein V(a) is a sequence number of a first segment in a transmission window, MaxWin is the size of the transmission window, and MaxP is a predefined integer less than MaxWin;
   (2) one or more segments are to be retransmitted from the transmitter to the receiver if the poll timer is already running;
   (3) a segment to be transmitted is a last segment in the buffer.

24. The method of claim 23, wherein the integer MaxP is dynamically determined.

25. The method of claim 23, wherein the integer MaxP depends on a number of consecutive lost acknowledgment messages allowed.

26. The method of claim 25, wherein MaxP is determined by the following expression:

$$MaxP = BW/PS * ((1+N)*RTT + N*POLLT)$$

wherein BW is bandwidth; PS is segment size, RTT is round trip time, and POLLT is a poll timer value, and N is set to provide a risk for transmission stall p below a limit.

27. The method of claim 23, wherein the integer MaxP depends on a frequency of negative acknowledgment messages.

28. The method of claim 23, wherein a time out value for the poll timer is dynamically determined.

29. The method of claim 23, further comprising canceling the poll timer if:
   (1) a segment to be transmitted is the last segment in the transmission buffer; and
   (2) an acknowledgment message has been received which has a start sequence number field which is greater than the sequence number of the last transmitted segment.

30. The method of claim 23, further comprising canceling the poll timer if:
   (1) a segment to be transmitted is not a last segment in the transmission buffer; and
   (2) any acknowledgment message is received which includes a start sequence number which is greater than the first segment (V(a)) in the transmission window.

31. A mobile telecommunications system comprising a node through which a packet switched data session is established with a user equipment unit, wherein the node serves as a receiver of segments of data packets, and
   wherein the receiver, upon arrival of a segment which is sequenced subsequent to a first lost segment, detects loss of the first lost segment and, in response to the arrival and detection of the loss, sends a first acknowledgment message to the transmitter, and wherein if (1) the first lost segment is not received within a timed interval initiated in conjunction with detection of the loss of the first lost segment and (2) the receiver subsequently determines that a second lost segment has been lost during the timed interval, at expiration of the timed interval the receiver sends a second acknowledgment message to the transmitter, the second selective acknowledgment message indicating loss of both the first lost segment and the second lost segment.

32. A mobile user equipment unit which serves as a receiver of segments of data packets in a packet switched data session, and
   wherein the receiver, upon arrival of a segment which is sequenced subsequent to a first lost segment, detects loss of the first lost segment and, in response to the arrival and detection of the loss, sends a first acknowledgment message to the transmitter, and wherein if (1) the first segment is not received within a timed interval initiated in conjunction with detection of the loss of the first lost segment and (2) the receiver subsequently determines that a second lost segment has been lost during the timed interval, at expiration of the timed interval the receiver sends a second acknowledgment message to the transmitter, the second selective acknowledgment message indicating loss of both the first lost segment and the second lost segment.

* * * * *